United States Patent [19]

Takano et al.

[11] 4,420,779
[45] Dec. 13, 1983

[54] AUTOMATIC CASSETTE CHANGER

[75] Inventors: Yoshikazu Takano; Tomohisa Kamimura; Mitsunobu Fujikawa, all of Tokyo, Japan

[73] Assignee: Sony Corporation, Tokyo, Japan

[21] Appl. No.: 292,912

[22] Filed: Aug. 14, 1981

Related U.S. Application Data

[63] Continuation-in-part of Ser. No. 279,732, Jul. 2, 1981, abandoned.

[30] Foreign Application Priority Data

Jul. 2, 1980 [JP] Japan ................................. 55-90176

[51] Int. Cl.³ ....................... G11B 15/68; G11B 23/04
[52] U.S. Cl. ..................................................... 360/92
[58] Field of Search ....................... 360/92, 85, 91, 69, 360/71; 242/198–199

[56] References Cited

U.S. PATENT DOCUMENTS

| | | | |
|---|---|---|---|
| 3,659,859 | 5/1972 | Marcinkus | 360/92 |
| 3,836,154 | 9/1974 | Ishikawa | 360/92 |
| 3,956,768 | 5/1976 | Covington | 360/92 |
| 4,023,207 | 5/1977 | Cook | 360/92 |
| 4,072,991 | 2/1978 | Kok | 360/92 |
| 4,160,281 | 7/1979 | Sato | 360/92 |

OTHER PUBLICATIONS

IBM Tech. Disc. Bull., R. A. Barbeau et al., Cartridge Autoloader, vol. 4, No. 11, Apr. 1962, pp. 11–13.

Primary Examiner—Alfred H. Eddleman
Attorney, Agent, or Firm—Lewis H. Eslinger; Alvin Sinderbrand

[57] ABSTRACT

An automatic cassette changer is provided for use with a cassette VTR of the type having push-buttons depressible for selecting at least recording, reproducing and rewinding modes, respectively, of the VTR, and a cassette holder movable between a raised position for receiving or delivering a cassette and a lowered position at which a cassette in the holder can have its tape acted upon by the VTR in a selected one of its modes. The automatic cassette changer provides a magazine for housing a plurality of cassettes; cassette-manipulating devices operative in a plurality of modes in succession for removing a cassette from the magazine and inserting the same into the cassette holder at its raised position, moving the cassette holder to its lowered position so that the VTR can act to record, reproduce or rewind the tape of the cassette in the holder, and discharging the cassette from the holder upon the return of the latter to its raised position; a mode selecting assembly actuable for selecting the modes of the cassette-manipulating means; a first motor for driving the mode selecting assembly, actuators adapted to be driven for causing operation of the cassette-manipulating devices in each selected one of the modes of the latter determined by said mode selecting assembly; and a second motor for driving said actuators.

22 Claims, 43 Drawing Figures

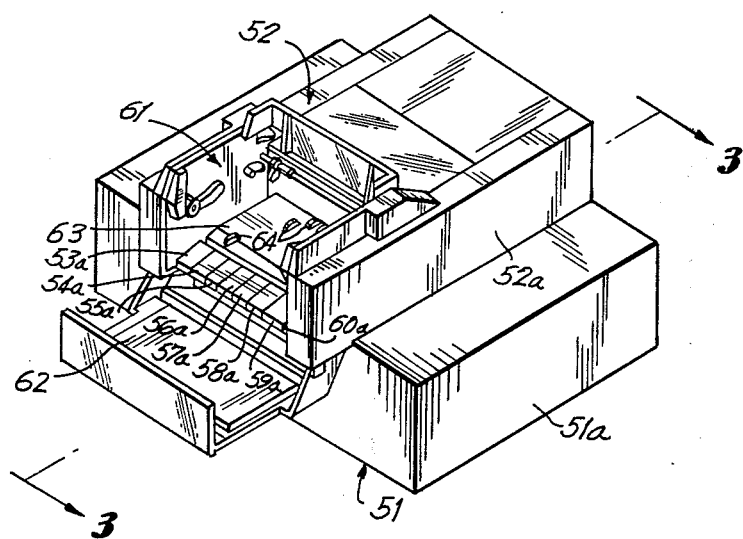
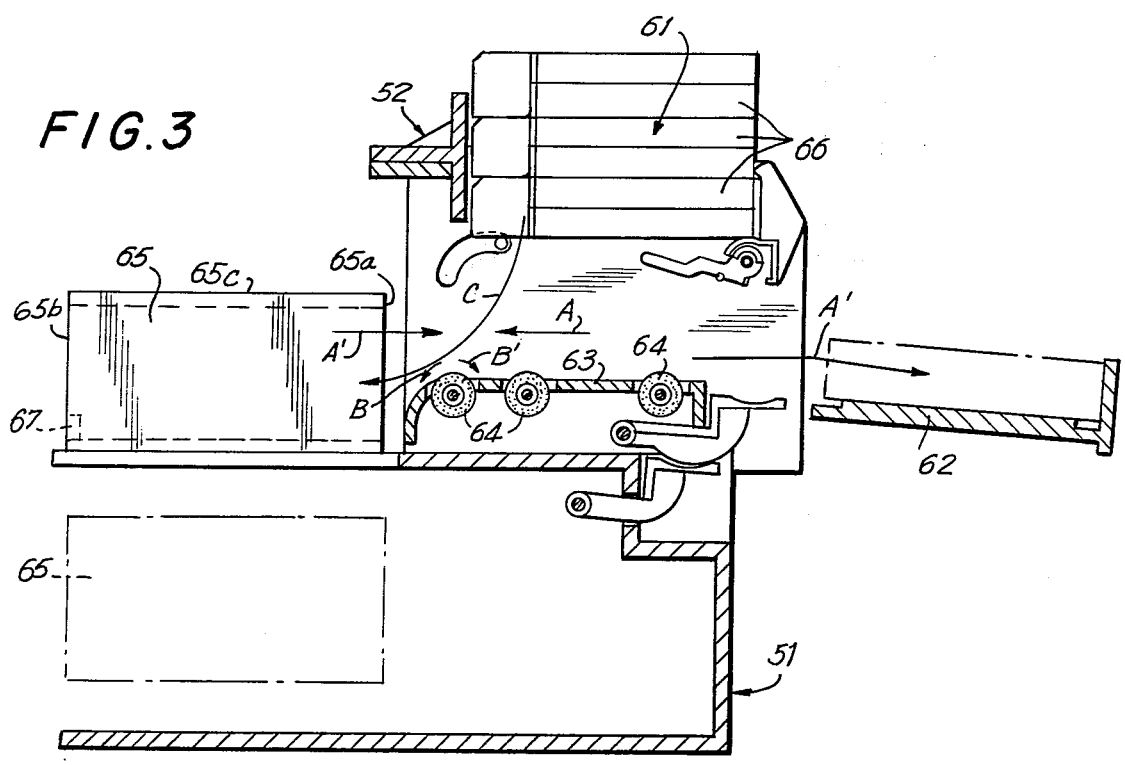

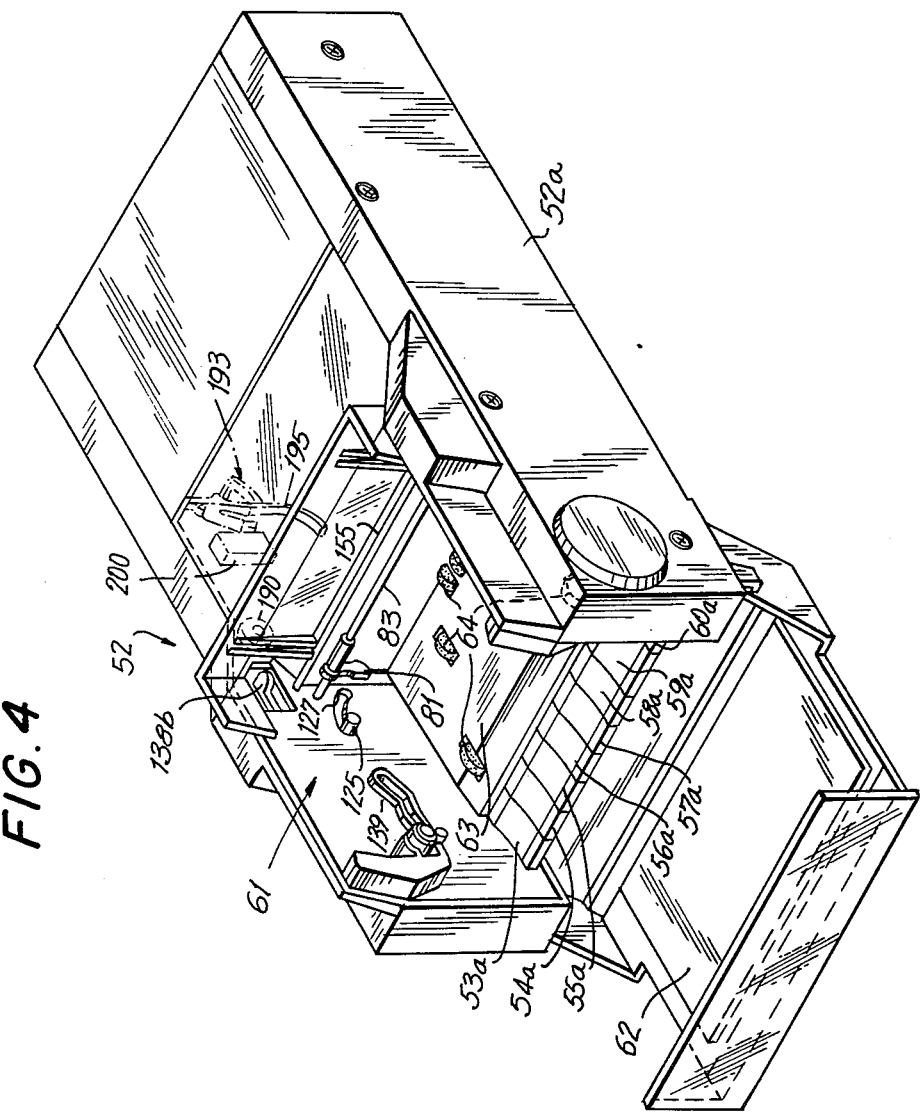

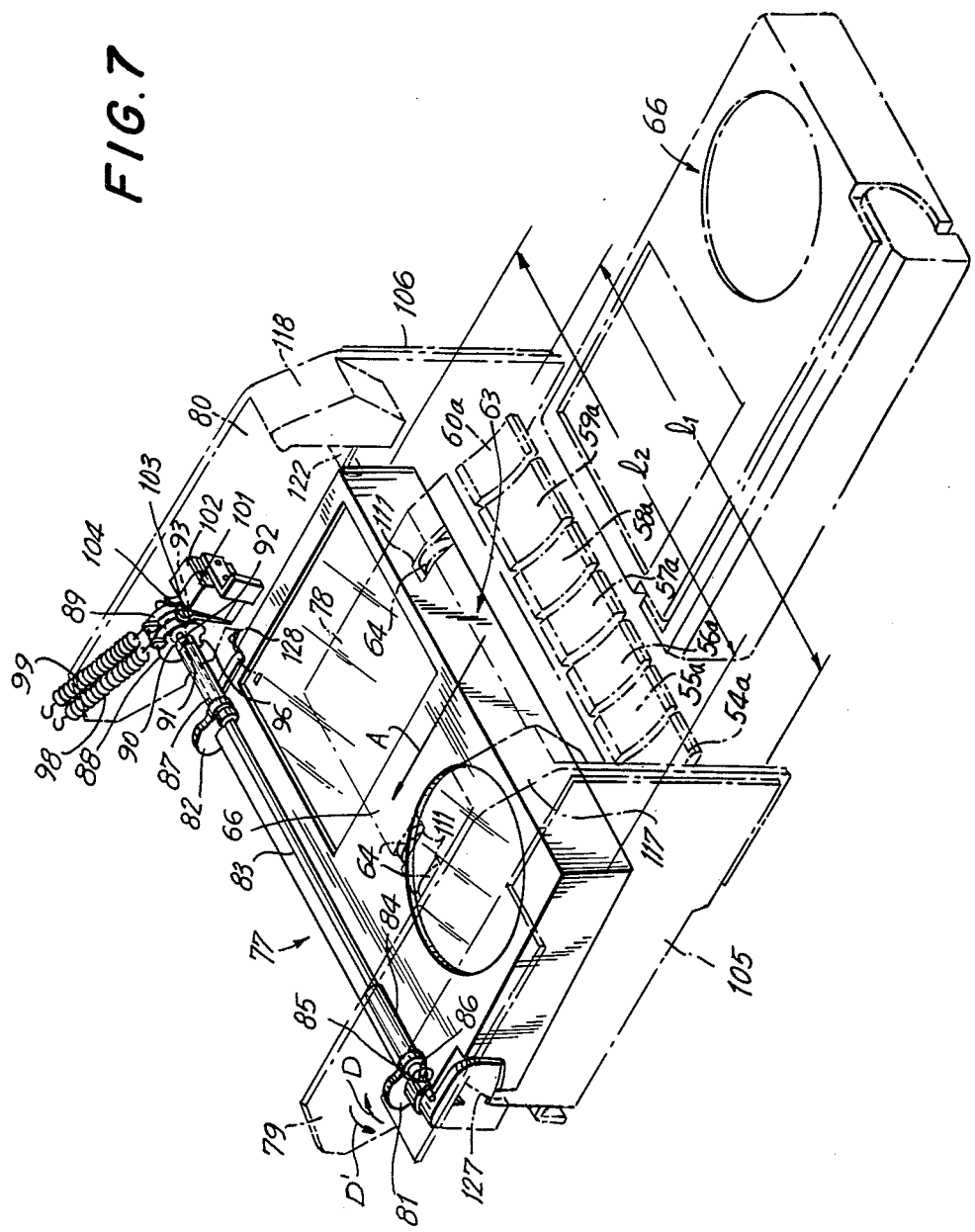

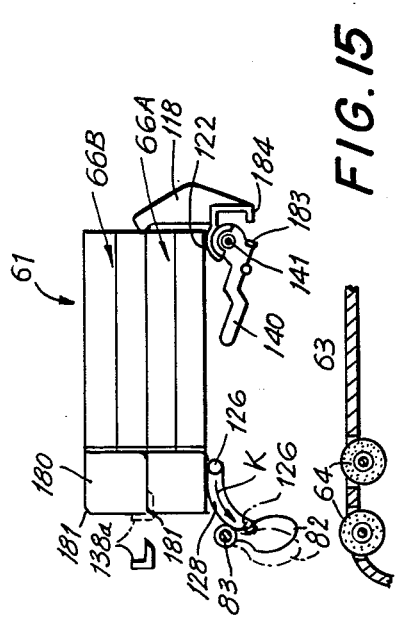
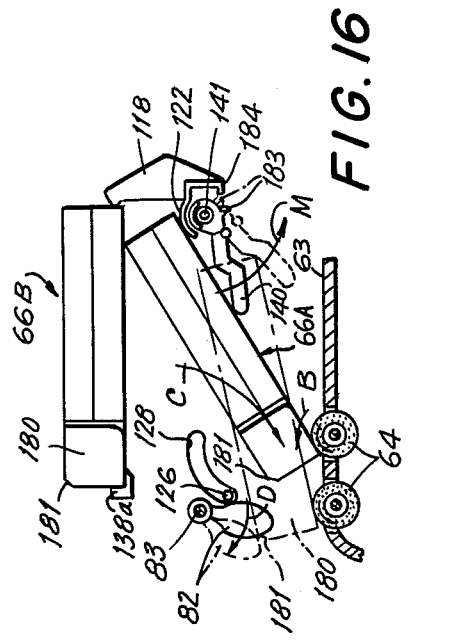
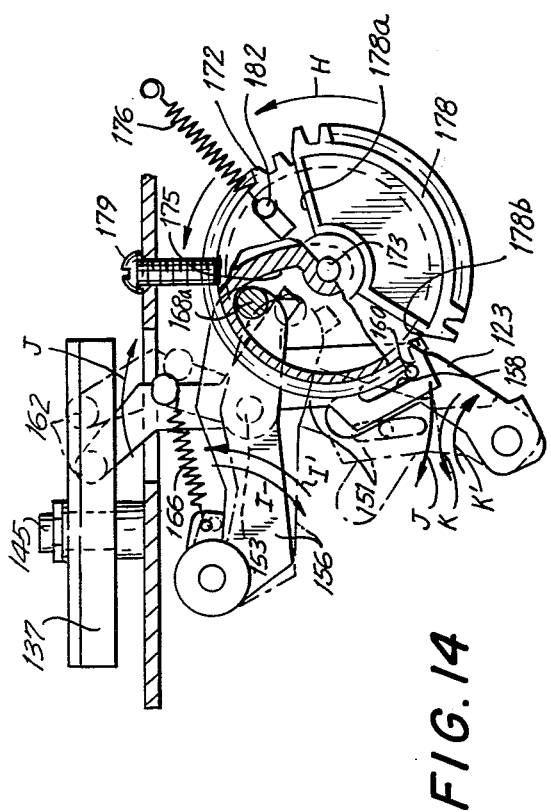
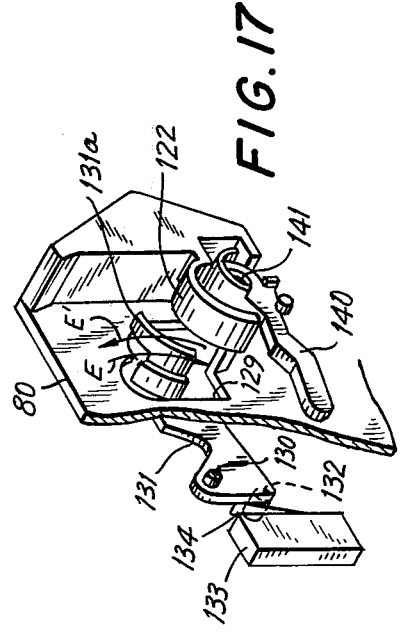

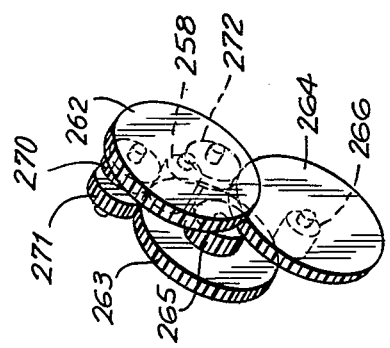
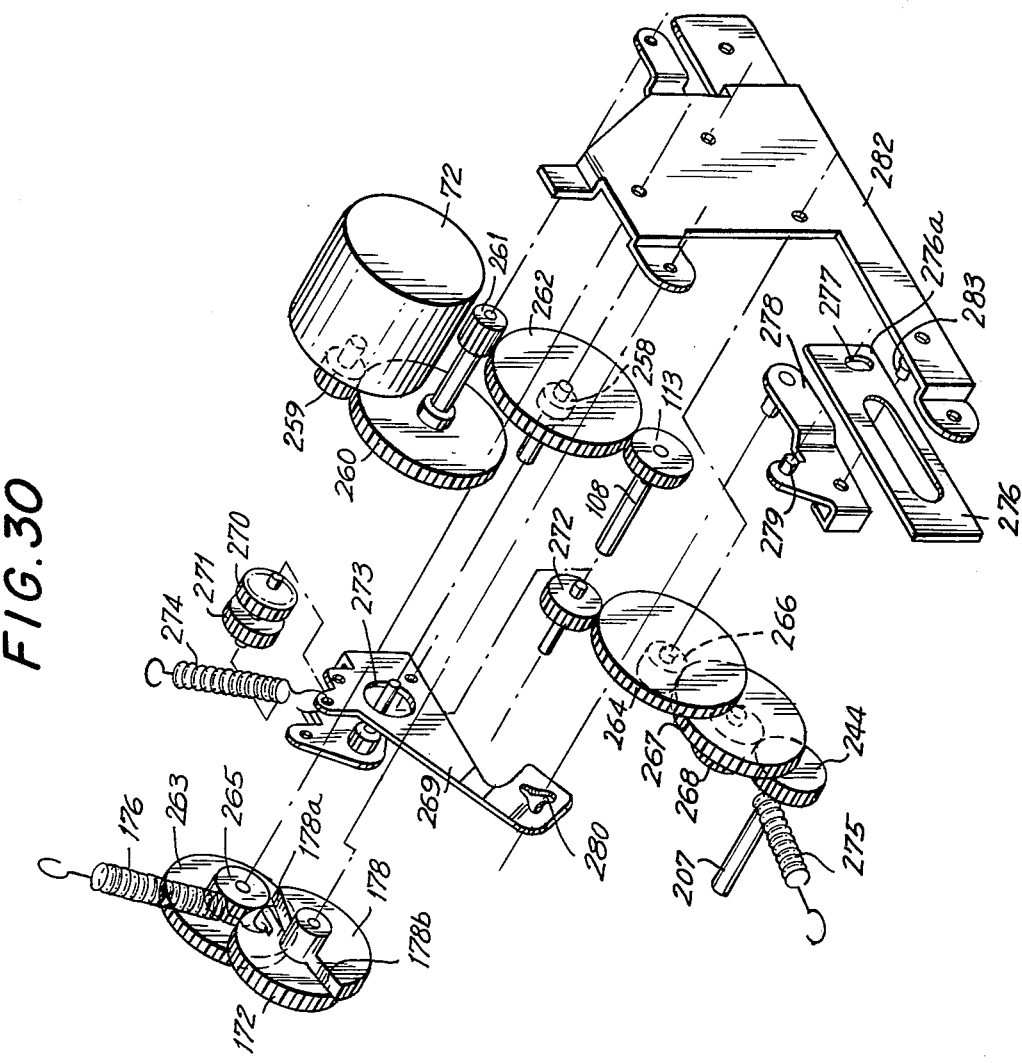

AUTOMATIC CASSETTE CHANGER

RELATED APPLICATION

This application is a continuation-in-part of our copending application Ser. No. 279,732, filed July 2, 1981, now abandoned.

BACKGROUND OF THE INVENTION

1. Field of the Invention

This invention relates generally to an automatic cassette changer, and more particularly is directed to an automatic cassette changer suited for application to a recording and reproducing apparatus of the type known as a cassette VTR (Video Tape Recorder).

2. Description of the Prior Art

Various automatic cassette changers have been proposed for use with cassette VTRs so that a plurality of cassettes can be stored in the changer and automatically supplied one at a time to the associated VTR as needed for recording or reproducing operations. However, in many of such proposed automatic cassette changers, the timing and occurrence of the series of operations required for automatically exchanging cassettes in the associated VTR are controlled in a purely mechanical manner and without effecting overall system control. Further, to provide the motive forces for performing such operations in the proposed changers, the torque of a motor is converted to a spring force which is then stored in a fly wheel as an inertial force. By reason of the foregoing characteristics of the proposed automatic cassette changers, the latter have inherent disadvantages, such as, extreme structural complexity, high price, susceptibility to malfunction and relatively poor reliability. Further, with the proposed automatic cassette changers, it is difficult to achieve repeated operations of the associated VTR in any one of its various operating modes, such as, the recording, reproducing or rewinding modes.

OBJECTS AND SUMMARY OF THE INVENTION

Accordingly, it is an object of this invention to provide an improved automatic cassette changer particularly suited for use with cassette VTRs, and which avoids the above-mentioned disadvantages of the previously proposed automatic cassette changers.

More specifically, it is an object of this invention to provide an automatic cassette changer of relatively simple construction and improved reliability.

Another object is to provide an automatic cassette changer, as aforesaid, which, when associated with a cassette VTR, is capable of easily effecting repeated operations of such VTR in its various modes, such as, recording, reproducing and rewinding modes, on the tapes of cassettes which are supplied one after the other to the VTR.

In accordance with an aspect of this invention, there is provided for use with a cassette VTR having push-buttons depressible for selecting at least recording, reproducing and rewinding modes, respectively, of the VTR, and a cassette holder movable between a raised position for receiving or delivering a cassette and a lowered position at which a cassette in the holder can have its tape acted upon by the VTR in a selected one of the operating modes of the latter, with the cassette holder being returned to its raised position upon completion of operation of the VTR in the selected one of its modes; an automatic cassette changer comprising means defining a magazine for housing a plurality of cassettes; cassette-manipulating means operative in a plurality of modes in succession for removing a cassette from the magazine and inserting the same into the cassette holder at its raised position, moving the cassette holder to its lowered position so that the VTR can act on the tape of a cassette in the holder in the selected one of the operating modes of the VTR, and discharging the cassette from the holder upon the return of the latter to its raised position; mode selecting means actuable for selecting the modes of the cassette-manipulating means; a first motor for driving the mode selecting means; actuator means adapted to be driven for causing operation of said cassette-manipulating means in each selected one of said modes of the latter determined by said mode selecting means; and a second motor for driving said actuator means.

The above, and other objects, features and advantages of the invention, will be apparent in the following detailed description of an illustrative embodiment of the invention which is to be read in connection with the accompanying drawings.

BRIEF DESCRIPTION OF THE DRAWINGS

FIG. 2 is a perspective view similar to that of FIG. 1, but showing the automatic cassette changer mounted in its operative position on the VTR;

FIG. 3 is an enlarged, fragmentary sectional view taken along the line 3—3 on FIG. 2 for showing the positional relationship of certain parts of the automatic cassette changer according to this invention in respect to components of the VTR;

FIG. 4 is an enlarged perspective view of the automatic cassette changer of FIGS. 1 and 2, but showing further details thereof;

FIG. 7 is a perspective view similar to that of FIG. 5 but illustrating the manner in which the device there shown is effective to detect the proper or improper insertion of a cassette;

FIG. 14 is a side elevational view, which is partially cut away and in section, of the gear-driven device of FIG. 13 and the associated elements of the cassette-dropping assembly of FIG. 12;

FIGS. 15 and 16 are sectional views, similar to that of FIG. 11 but on a smaller scale, and illustrating the manner in which a cassette is dropped or removed from the bottom of the stack thereof in the magazine;

FIG. 17 is a detailed perspective view showing a detecting device for sensing the removal from the magazine of the last of the cassettes stored therein;

FIG. 30 is an exploded perspective view showing the elements included in the drive assembly of FIG. 29;

FIG. 31 is a perspective view showing certain gears of the drive assembly of FIGS. 29 and 30 in meshing engagement.

DETAILED DESCRIPTION OF A PREFERRED EMBODIMENT

Figure 1:
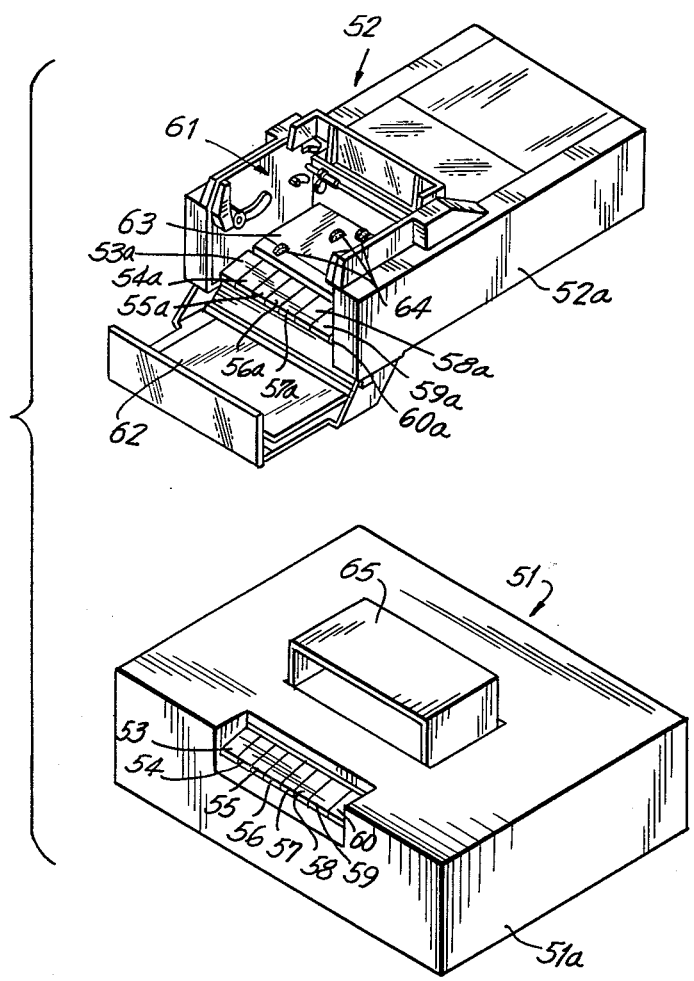
FIG. 1 is an exploded perspective view illustrating an automatic cassette changer according to an embodiment of this invention and a cassette VTR intended for use therewith, such apparatus being shown prior to the mounting of the automatic cassette changer on the VTR.

Referring first to FIG. 1, it will be seen that a cassette VTR 51 of a type with which an automatic cassette changer 52 according to this invention is intended to be used includes a casing 51a having, at the top of the front thereof, an assembly of eight push-buttons which are adapted to be depressed for selecting respective operating modes of the VTR 51. The illustrated automatic cassette changer 52 is particularly suitable for application to any one of the VTRs available commercially from Sony Corporation under the designations Betamax recorders SL-5400, SL-5600 and SL-5800. As shown, the push-button assembly of each of such VTRs comprises a pause button 53 actuable to temporarily halt a recording or reproducing operation of the VTR so long as the pause button is depressed and to resume the previously selected recording or reproducing operation when the pause button is released; and eject button 54 actuable to cause VTR 51 to return a cassette holder 65 thereof from a lowered operative position to a raised position shown on FIG. 1 and at which a cassette can be removed forwardly from holder 65; a rewind button 55 actuable to cause high-speed rewinding of the tape from a take-up reel to a supply reel of a cassette while the latter is contained in holder 65 at the lowered operative position of the latter; a stop button 56 actuable to cause VTR 51 to halt a recording, reproducing, fast-forward, rewind or audio dubbing operation; a reproducing button 57 actuable to initiate a reproducing operation of the VTR; a fast-forward push-button 58 actuable to effect the high-speed transfer of the tape in the direction from the supply reel to the take-up reel; a recording button 59 actuable to initiate a recording operation of the VTR; and an audio dubbing button 60 actuable to cause the VTR to record only audio signals on the tape.

Figure 9:
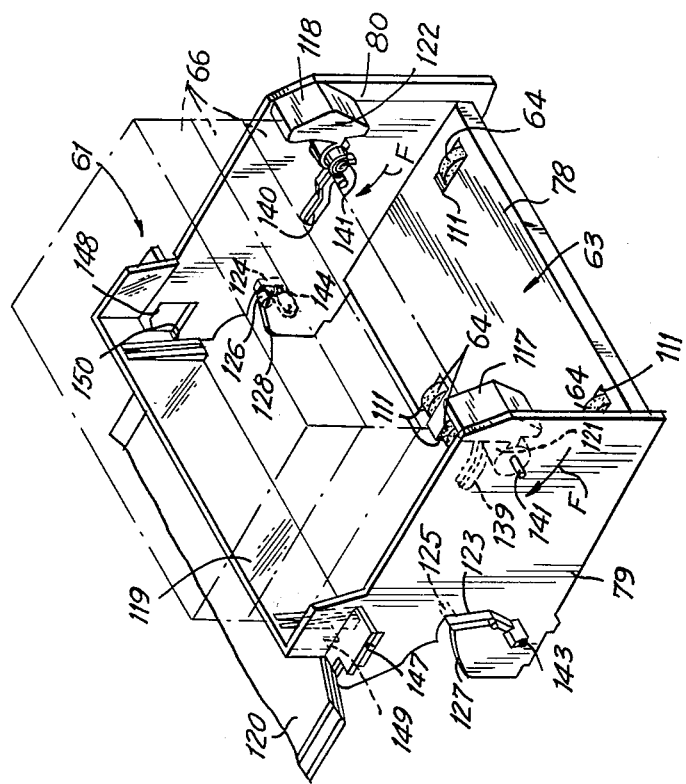
FIG. 9 is a perspective view of a portion of the automatic cassette changer which defines a magazine adapted to house or hold a stack of cassettes.

The automatic cassette changer 52 embodying this invention is shown to comprise a body or housing 52a which, as shown on FIG. 2, is adapted to be detachably mounted on top of casing 51a of VTR 51 so as to span cassette holder 65 of the VTR. Mounted at the forward end of housing 52a adjacent the bottom of the latter are eight push-buttons 53a, 54a, 55a, 56a, 57a, 58a, 59a and 60a which overlie the push-buttons 53, 54, 55, 56, 57, 58, 59 and 60, respectively, of VTR 51 when the cassette changer housing 52a is mounted on VTR casing 51a. A magazine 61 for containing a stack of cassettes 66, for example, as shown on FIGS. 3 and 9, is defined at the forward portion of housing 52a, and a discharged cassette receiver 62 (FIGS. 1–4) is detachably mounted below the front end of housing 52a so as to project forwardly therefrom. At the bottom of housing 52a, there is a cassette loading and unloading passage 63 which extends rearwardly from above push-buttons 53a–60a under magazine 61 so as to communicate with a front opening 65a of cassette holder 65 when the latter is in its raised position shown in full lines on FIG. 3. It will be appreciated that, with automatic cassette changer 52 mounted on VTR 51, any one of the push-buttons 53a–60a of changer 52 can be manually depressed so as to effect depression of the respective underlying push-button 53–60 of VTR 51.

The purpose of automatic cassette changer 52 is to permit VTR 51 to effect successive recording, reproducing or rewinding operations on the tapes of a plurality of cassettes 66 which are arranged in a stack in magazine 61 (as shown on FIG. 3) and which are withdrawn from the bottom of the stack, one at a time, so as to be each exchanged with a cassette on which a recording, reproducing or rewinding operation has been completed by VTR 51. In order to achieve the foregoing purpose, the automatic cassette changer 52 undergoes the following generally described operations:

(a) With a stack of cassettes 66 contained in magazine 61, another cassette 66 is initially inserted manually by the operator in the direction of the arrow A on FIG. 3 through cassette loading and unloading passage 63. If the manually inserted cassette 66 has the correct orientation, a plurality of feed rollers 64 disposed at the bottom of passage 63 are rotated in the direction of the arrow B on FIG. 3 so as to further propel the manually inserted cassette 66 through front opening 65a of holder 65 which is then in its raised position shown in full lines on FIG. 3. The movement of the inserted cassette 66 by feed rollers 64 is suitably arrested in holder 65 by a stop 67 provided at the lower portion of the back 65b of holder 65.

(b) Following such manual initial insertion of a cassette 66 in holder 65, cassette changer 52 effects downward movement of holder 65 to its lowered or operative position shown in broken lines on FIG. 3, and at which the VTR automatically performs a tape loading operation, that is, tape is withdrawn from the cassette in holder 65 at the lowered or operative position, and the withdrawn tape is loaded or wrapped around the usual guide drum (not shown) of VTR 51.

(c) At the completion of the tape loading operation, any one of recording push-button 59a, reproducing push-button 57a and rewind push-button 55a may be depressed manually by the operator so as to depress the recording push-button 59, reproducing push-button 57 or rewind push-button 55, respectively, of VTR 51 and thereby selectively establish and initiate operation of the VTR in its recording, reproducing or rewind mode.

(d) When the end of the tape in the cassette then being acted on, or a preset time is reached during the recording, reproducing or rewinding operation of VTR 51, the latter initiates an automatic shut-off operation in a well known manner, and cassette changer 52 automatically depresses eject push-button 54a to correspondingly depress eject push-button 54 of VTR 51 with the result that cassette holder 65 is returned to its raised position. Upon the return of holder 65 to its raised position, the cassette 66 in holder 65 is propelled therefrom in the direction of arrow A' on FIG. 3 and feed rollers 64 are rotated in the direction of arrow B' so as to drive the cassette out of holder 65 and through passage 63 and onto the discharged cassette receiver 62.

(e) Upon such ejection and discharge of a cassette 66 on which a recording, reproducing or rewinding operation has been completed, another cassette 66 is dropped from the bottom of the stack of cassettes in magazine 61 into passage 63 in which feed rollers 64 are again rotated in the direction of arrow B (FIG. 3) for inserting such cassette into the raised cassette holder 65. Following insertion of the new cassette in holder 65, the latter is again automatically lowered to its operative position where a tape loading operation is performed.

(f) At the completion of the tape loading operation, and on the basis of the initial selection of the mode of operation of VTR 51, one or the other of the recording push-button 59a, reproducing push-button 57a and rewinding push-button 55a is depressed automatically to again initiate operation of VTR 51 in the initially selected mode.

(g) When the tape end or preset time is reached, the above-described cycle of operations is again performed automatically to replace the cassette that has been acted upon by the VTR with a new cassette from the stack thereof in changer 52. Such automatic cassette changing operations are repeated automatically until no cassette remains in magazine 61 of changer 52.

Figure 41:
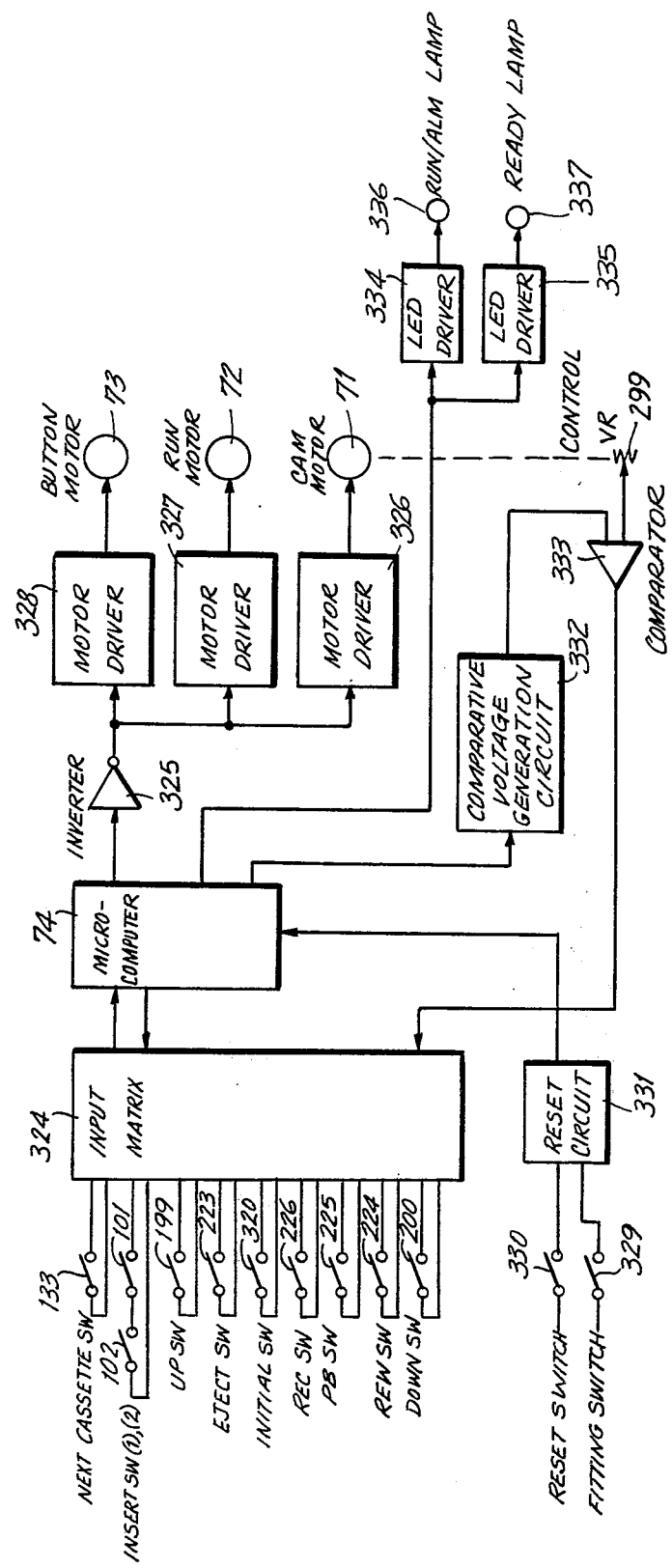
FIG. 41 is a block diagram schematically illustrating control circuits that may be provided for the automatic cassette changer embodying the invention.

As shown generally on FIG. 41, automatic cassette changer 52 according to this invention is provided with first, second and third reversible electric motors 71, 72 and 73, respectively. Such reversible motors are controlled by a microcomputer or CPU 74 which may be incorporated in a rear end portion of housing 52a, and which controls the motors in a systematic fashion on the basis of conditions detected by a number of detecting switches, as hereinafter described in detail. The first motor 71 is operable for selecting from among a number of operating modes of automatic cassette changer 52. For example, first motor 71 may drive a mode selecting arrangement having a plurality of conditions each corresponding to two respective operating modes of the changer. More specifically, the mode selecting arrangement driven by first motor 71 may have a first condition for selecting the mode of changer 52 in which a cassette is dropped or removed from the bottom of the stack in magazine 61 in response to operation of second motor 72 in the forward direction, or for selecting the mode of operation of changer 52 in which holder 65 is moved downwardly to its lowered or operative position upon operation of second motor 72 in the reverse direction; a second condition for selecting the mode of changer 52 in which eject push-button 54a is depressed in response to operation of motor 72 in the forward direction, or for selecting the mode of changer 52 in which rewind push-button 55a is depressed upon operation of second motor 72 in the reverse direction; and a third condition of the mode selecting arrangement for selecting the mode of changer 52 in which a cassette is inserted into holder 65 in its raised position upon operation of second motor 72 in its forward direction, or for selecting the mode of changer 52 in which a cassette is discharged from raised holder 65 upon operation of motor 72 in its reverse direction. The third motor 73 of changer 52 is generally operative to effect depressing of push-button 59a or depressing of reproducing push-button 57a upon operation of third motor 73 in the forward or reverse directions, respectively.

As shown on FIG. 9, the cassette loading and unloading passage 63 is defined in housing 52a by a generally horizontal bottom plate 78 and by opposite side plates or walls 79 and 80 extending upwardly from the lateral margins of bottom plate 78 to form a generally U-shaped section with an open top. The spacing or distance $l_1$ between the opposite side plates 79 and 80 (FIG. 7) is selected to be slightly larger than the width or relatively long dimension of the standardized generally rectangular housing of cassette 66.

Figure 5:
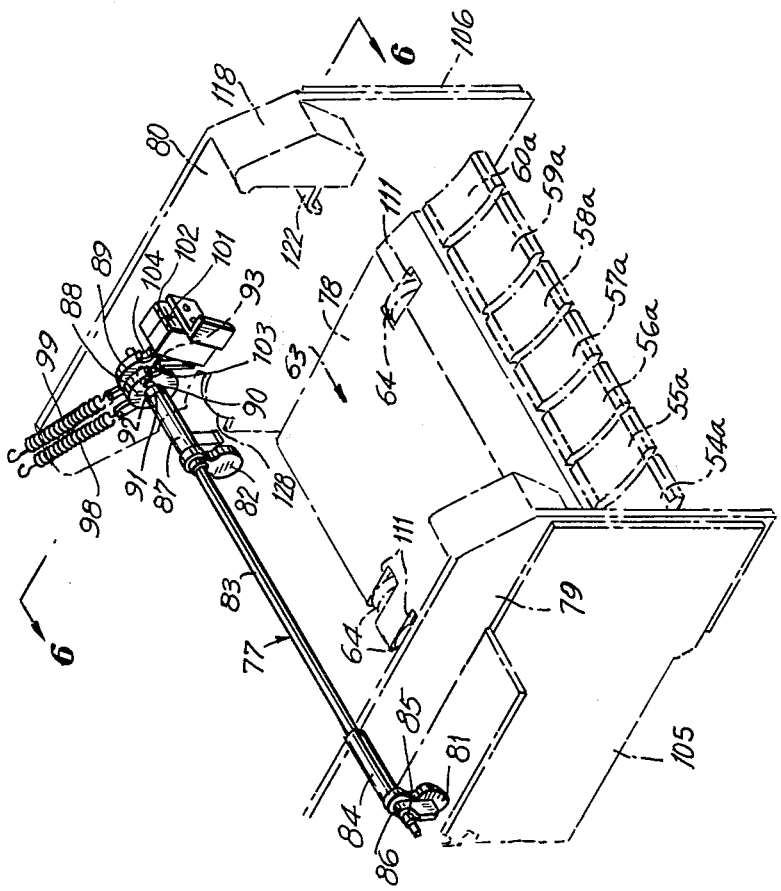
FIG. 5 is a fragmentary perspective view showing a device including in the automatic cassette changer according to this invention for detecting the proper insertion of a cassette therein.

In order to ensure that the cassette which is initially manually inserted into passage 63 is properly oriented, that is, arranged with its large dimension extending laterally between side plates 79 and 80, changer 52 is provided with a cassette insertion detector 77 (FIGS. 5 and 7) which is disposed adjacent the back-end portion of passage 63. Such cassette insertion detector 77 is shown to include cassette detecting members 81 and 82 which rotatably depend from a supporting shaft 83 which extends horizontally between side plates 79 and 80. The cassette detecting members 81 and 82 are suitable spaced apart along shaft 83 so as to be simultaneously engageable by a cassette moving along passage 63 only if such cassette has its major dimension extending laterally between plates 79 and 80, for example, as in the case of cassette 66 shown in full lines on FIG. 7. The cassette detecting member 81 is formed integrally with a sleeve 84 which extends over shaft 83 and is rotatably coupled to the latter, for example, by means of a groove 85 formed in sleeve 84 and receiving a pin 86 secured to shaft 83. The other cassette detecting member 82 is formed integrally with a sleeve 87 which has a shaft 83 extending rotatably therethrough. An end portion of shaft 83 extending outwardly from side plate 80 has a pair of switch actuating cams 88 and 89 mounted thereon. More particularly, switch actuator cam 88 is integral with a sleeve 90 which extends over shaft 83 and is rotatably coupled with cassette detecting member 82, for example, by providing a groove 91 in an end face of sleeve 90 receiving a lug 92 extending from an end face of sleeve 87. The other switch actuating cam 89 is integral with a sleeve 93 which also extends over shaft 83 but is rotatably coupled with the latter, for example, by engagement of a groove 94 formed in sleeve 93 with a pin 95 secured to shaft 83.

The switch actuating cams 88 and 89 are in the form of radial cams constituted by respective discs having notches or depressions 96 and 97, respectively, in their peripheral surfaces. Return springs 98 and 99 are connected to switch actuating cams 88 and 89, respectively, so as to yieldably urge such cams to returned positions indicated in full lines on FIG. 6. Cassette detecting switches 101 and 102 having actuators 103 and 104, respectively, are mounted in side-by-side relation on a mounting plate or board 106 which is attached to the outer surface of side plate 80. The cassette detecting switches 101 and 102 are disposed so that their actuators 103 and 104 are urged against the peripheral surfaces of cams 88 and 89, respectively. When cams 88 and 89 are in their normal or returned positions shown in full lines on FIG. 6, the respective cassette detecting members 81 and 82 depend vertically downward from shaft 83 and actuators 103 and 104 of the switches engage in notches 96 and 97 to turn OFF cassette detecting switches 101 and 102.

With the cassette insertion detector 77 constructed as described above, a correctly oriented cassette 66 moving through passage 63, as shown in full lines on FIG. 7, will simultaneously actuate both cassette detecting members 81 and 82. That is, as the correctly inserted cassette 66 is moved in the direction of the arrow A through passage 63, the opposite end portions of the cassette will simultaneously act against the lower end portions of cassette detecting members 81 and 82 for pivotally moving both of the latter in the direction of the arrow D on FIG. 7. Thus, both cams 88 and 89 will be made to rotate simultaneously in the direction of arrow D on FIG. 6 against the bias of return springs 98 and 99. As a result, both actuators 103 and 104 are displaced out of notches 96 and 97 of cams 88 and 89 so as to turn ON both switches 101 and 102. When the correctly inserted cassette 66 has been moved from passage 63 into holder 65, cassette detecting members 81 and 82 are simultaneously released by the cassette so that springs 98 and 99 are free to return cams 88 and 89 to their normal or returned positions in which actuators 103 and 104 engage in notches 96 and 97 for returning switches 101 and 102 to their OFF state.

It will be seen from the above that the correct orientation of the inserted cassette 66 is detected by the switches 101 and 102 being simultaneously changed over from their normal OFF state to the ON state, and then being simultaneously returned to their OFF state. If, however, the manually inserted cassette is incorrectly oriented, that is, arranged with its major axis or dimension extending in the direction of its inserting movement, as is the case with the cassette shown in dotdash lines on FIG. 7, then either one or the other of the cassette detecting members 81 and 82 will not be engaged by the cassette as the latter moves through passage 63 into holder 65. Thus, in the case of incorrect insertion of a cassette, both switches 101 and 102 will not be simultaneously turned ON and then simultaneously turned OFF. Further, it will be seen that the cassette detecting members 81 and 82 are sufficiently spaced apart so that if a child mischievously inserts a hand into passage 63, such hand cannot simultaneously rock both members 81 and 82 for providing a false indication of a correctly inserted cassette.

Although both cassette detecting members 81 and 82 could be engaged simultaneously by a cassette 66 inserted upside down in passage 63, the insertion of such upside down cassette in holder 65 is suitably prevented by presently used cooperatively engageable elements (not shown) of the cassette holder 65 of VTR 51 and of the cassette 66 intended for use therein.

When both cassette detecting switches 101 and 102 have been returned simultaneously to their OFF state at the completion of the detection of the correct insertion of a cassette 66, the operation of changer 52 proceeds to its next mode, that is, the operation of moving cassette holder 65 downwardly from its raised position to its lowered or operative position. However, if switches 101 and 102 are not simultaneously actuated for detecting the proper insertion of a cassette, as previously indicated, the operation of changer 52 cannot proceed to the next mode. Thus, in the event of the incorrect insertion of a cassette, or if a mischievous child inserts a hand through passage 63 beyond the back end of bottom plate 78, the downward movement of cassette holder 65 cannot occur and a potentially serious accident is avoided.

Figure 8:
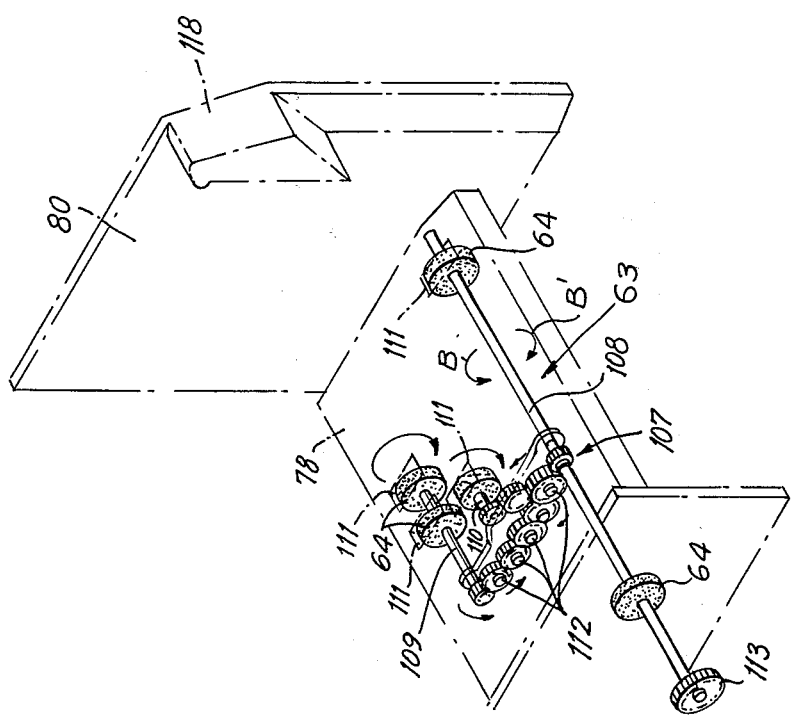
FIG. 8 is a perspective view of a feed-roller assembly included in the automatic cassette changer for either inserting a cassette into a cassette holder of the associated VTR or discharging a cassette from such cassette holder.

Referring now to FIG. 8, it will be seen that the previously mentioned feed rollers 64, which may be rubber-tired, are included in a feed roller drive assembly 107 which further includes rotatable roller supporting shafts 108, 109 and 110 extending laterally below bottom plate 78 of passage 63 so that respective rollers 64 secured on such shafts can extend through suitably located holes 111 in bottom plate 78 for driving engagement with the bottom surface of a cassette inserted in passage 63. More particularly, two of feed rollers 64 are secured at relatively widely spaced apart locations on shaft 108 which is mounted near the front end of passage 63 so that such rollers 64 will be disposed adjacent the opposite sides of passage 63. Two more rollers 64 are secured on shaft 109 so as to be relatively close to each other at the laterally centered portion of passage 63, and shaft 109 is positioned near the back end of plate 78. Finally, a fifth roller 64 is secured on shaft 110 which is disposed intermediate shafts 108 and 109 and rotatably coupled with the latter through a gear transmission 112.

Secured on the end of shaft 108 which extends beyond side plate 79 is a roller driving gear 113 which, as hereinafter described, is adapted to be driven from second motor 72 either in the direction of the arrow B or the arrow B'. It will be apparent that, upon rotation of shaft 108 in the direction of arrow B on FIG. 8, all of rollers 64 are rotated in the same direction for effecting the insertion of a cassette through passage 63 into the raised cassette holder 65, as previously described, whereas rotation of shaft 108 in the direction of arrow B' similarly rotates all of roller 64 in the same direction for effecting the discharge operation.

Figure 10:
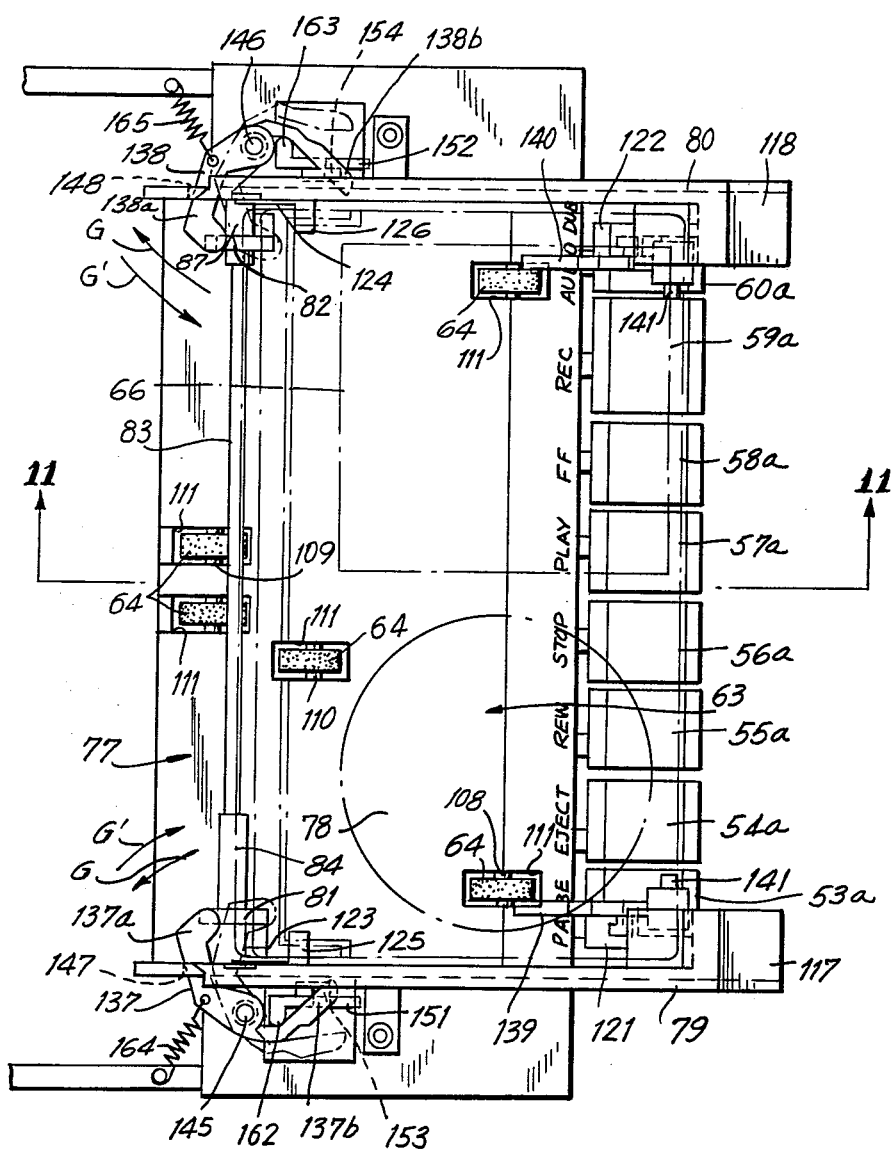
FIG. 10 is a top plan view of the magazine on a larger scale and showing further details of devices associated therewith for effecting the removal of the cassettes one at a time from the stack thereof in the magazine.
Figure 11:
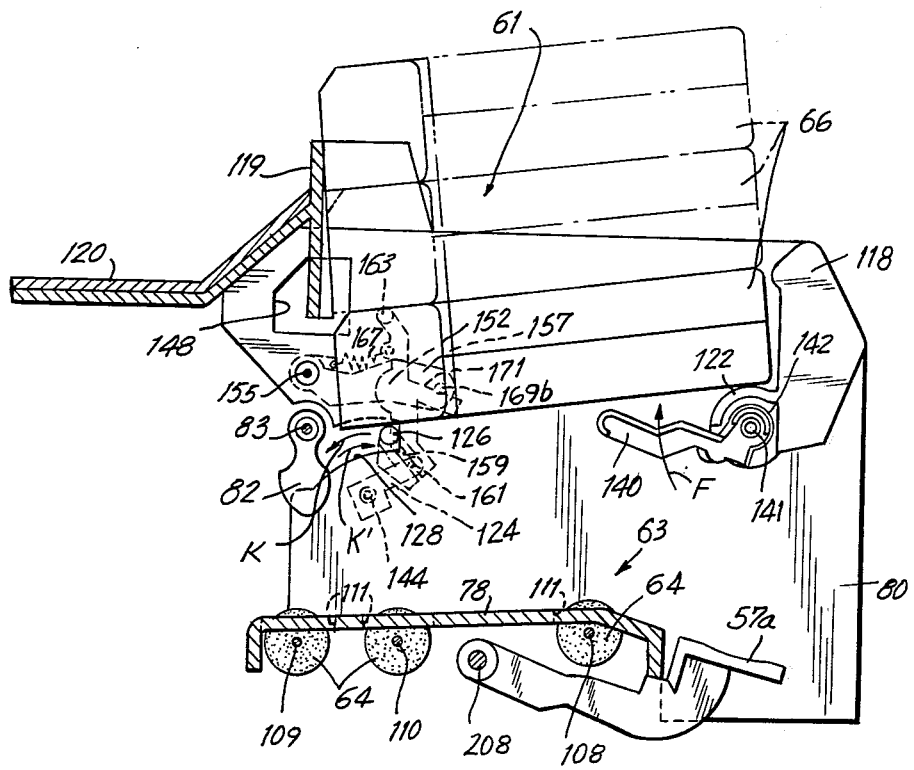
FIG. 11 is a sectional view taken along the line 11—11 on FIG. 10.

Referring now to FIGS. 9–11, it will be seen that magazine 61 for receiving a stack of cassettes 66 is defined, at its opposite sides, by the upper portions of side plates 79 and 80 which, at their front portions, have inwardly directed guiding members 117 and 118 extending integrally therefrom. At its rear side, magazine 61 is defined by a generally U-shaped frame plate 119 mounted between the rear portions of side plates 79 and 80 and being formed integrally with a cover 120 which forms at least a portion of the upper surface of housing 52a. Downwardly arcuate, substantially semi-circular cassette bearers 121 and 122 are directed rearwardly from the lower ends of guiding members 117 and 118, respectively. Disposed outwardly in respect to side plates 79 and 80 adjacent the rear portion of magazine 61 are cassette dropping levers 123 and 124, respectively. Cassette supporting projections 125 and 126 are formed integrally with the upper end portions of cassette dropping levers 123 and 124, respectively, and are directed inwardly therefrom through arcuate slots 127 and 128 formed in side plates 79 and 80, respectively. A cassette 66 inserted in magazine 61 from above is adapted to be substantially horizontally supported, at the front, on the cassette bearers 121 and 122 and, at the rear, on cassette supporting projections 125 and 126 projecting inwardly from the inner surfaces of side plates 79 and 80. After one cassette 66 has been thus supported in magazine 61, a plurality of additional cassettes 66 can be piled thereon one on top of the other in a stack, for example, as shown in FIG. 9.

As shown particularly in FIG. 17 an opening 129 is formed in side plate 80 adjacent cassette bearer 122. Through this opening 129 there projects to the inside of side plate 80 an arcuate end-portion 131a of a cassette detecting lever 131 which is pivotally mounted, by way of a pivot pin 130, on mounting board 106 at the outside of side plate 80. When a cassette 66 is horizontally supported on cassette bearers 121 and 122 and on cassette supporting projections 125 and 126 in magazine 61, curved end portion 131a of detection lever 131 is urged downwardly by the bottom surface of such cassette 66 so as to nest between adjacent cassette bearer 122 and side plate 80, with the result that cassette detection lever 131 is pivotally moved in the direction of arrow E. Upon such movement of lever 131 in the direction of arrow E, a switch actuating pin 132 on lever 131 acts against an actuator 134 of a cassette detecting switch 133 also carried by mounting board 106, with the result that switch 133 is turned ON for indicating or detecting the presence of a cassette 66 in magazine 61. When all of the cassettes 66 originally accomodated in magazine 61 have been removed from the latter, as hereinafter described, actuator 134 of cassette detecting switch 133 is returned to its original position by a spring (not shown) included in switch 133 so that the latter is turned OFF and, at the same time, cassette detecting lever 131 is again urged by actuator 134 to pivot in the direction of arrow E' and thereby position end portion 131a of lever 131 above the adjacent cassette bearer 122.

The cassette dropping levers 123 and 124 are shown on FIG. 12 to be parts of a cassette dropping assembly 116 which further includes cassette supporting levers 137 and 138 disposed adjacent the upper rear portions of side plates 79 and 80, respectively, and cassette guiding levers 139 and 140 extending rearwardly from below cassette bearers 121 and 122, respectively. Cassette guiding levers 139 and 140 are pivotally mounted, at their forward ends, on respective pivots 141 which are concentric with the arcuate cassette bearers 121 and 122, respectively. Cassette guiding levers 139 and 140 are pivotally urged in the direction of arrow F on FIGS. 9 and 11 by means of respective torsion springs 142 so as to normally abut against ends of cassette bearers 121 and 122 and thereby normally hold levers 139 and 140 in approximately horizontal returned positions, as shown on FIGS. 9 and 11.

Cassette dropping levers 123 and 124 have pivot pins 143 and 144 at their lower ends which are suitably mounted in adjacent mounting boards 105 and 106 so as to provide for pivoting of levers 123 and 124 in vertical planes. Cassette supporting levers 137 and 138 have vertical pivot pins 145 and 146, respectively, which are suitably engaged with mounting boards 105 and 106 so as to mount levers 137 and 138 for pivoting in a horizontal plane. Such cassette supporting levers 137 and 138 are shown to be substantially L-shaped so as to have inwardly directed arms with flanges 137a and 138a adapted to support the rear portion of a cassette in magazine 61 when levers 137 and 138 are pivoted in the directions of the arrows G' on FIG. 12. Since levers 137 and 138 are pivotally mounted at the outer sides of side plates 79 and 80, such side plates 79 and 80 are provided with openings 147 and 148, and frame plate 119 is provided with cut-outs 149 and 150 adjacent openings 147 and 148, respectively. Thus, flanged-end portions 137a and 138a of the cassette supporting levers can extend through opening 147 and cutout 149, and through opening 148 and cutout 150 into magazine 61 at the back of the latter. Interlocking levers 151 and 152 having pivots 153 and 154 are mounted by the latter on mounting boards 105 and 106, respectively, for swinging in vertical planes adjacent levers 123 and 124, respectively. A rotatable interlocking shaft 155 extends horizontally between mounting boards 105 and 106, and has actuating levers 156 and 157 secured to the opposite ends of shaft 155 (FIG. 12).

The interlocking levers 151 and 152 have slots 158 and 159, respectively, in their lower end portions and which slidably receive pins 160 and 161, respectively, extending integrally from cassette dropping levers 123 and 124, respectively. Projections 162 and 163 are directed outwardly from the upper end portions of interlocking levers 151 and 152, respectively, for abutment against the inner surfaces of bent arms 137b and 138b of cassette supporting levers 137 and 138, respectively. Return springs 164 and 165 are connected to cassette supporting levers 137 and 138 for pivotally biasing the latter in the directions of the arrows G on FIGS. 10 and 12 and thereby urging levers 137 and 138 to their returned positions shown in full lines on FIG. 10, and in which there ends 137b and 138b abut inwardly against side plates 79 and 80, respectively, and the opposite flanged ends 137a and 138a are withdrawn rearwardly from within magazine 61. Springs 166 and 167 are connected between interlocking levers 151 and 152 and actuating levers 156 and 157, respectively, for pulling levers 156 and 166 and levers 157 and 167 toward each other. The tip or free end of actuating lever 156 is formed with oppositely directed integral pines 168a and 168b, and the tip end of actuating lever 157 is similarly integrally formed with oppositely directed pins 169a and 169b. The inwardly directed pins 168b and 169b slideably engage upon obliquely disposed arms 170 and 171 formed integrally with interlocking levers 151 and 152, respectively.

Figure 13:
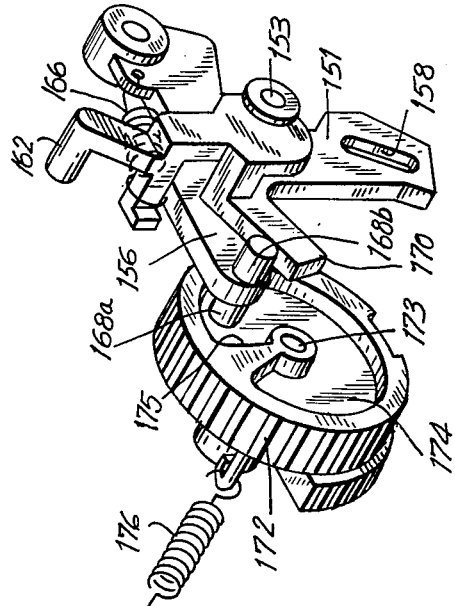
FIG. 13 is an enlarged perspective view of a gear-driven device for effecting operations of the assembly shown on FIG. 12.

A gear shaft 173 which is suitably journaled in mounting board 105 has a cassette drop driving gear 172 (FIGS. 13 and 14) fixed thereon. A recess 174 is formed in the inwardly directed surface of gear 172 and the outwardly directed pin 168a of the adjacent actuating lever 156 is received in recess 174 and engages a cam surface 175 defined by the circumference or periphery of recess 174 (FIG. 13). Cassette drop driving gear 172 is adapted to be held in its returned position shown in full lines on FIG. 14 by means of a return spring 176, and may be rotated in the direction of arrow H on FIG. 14 by means of a hereinafter described gear transmission in response to operation of second motor 72.

A holder-down driving gear 178 in the form of a sector gear of the same diameter as cassette drop driving gear 172 is formed integrally with the latter at the outer side of gear 172.

Figure 12:
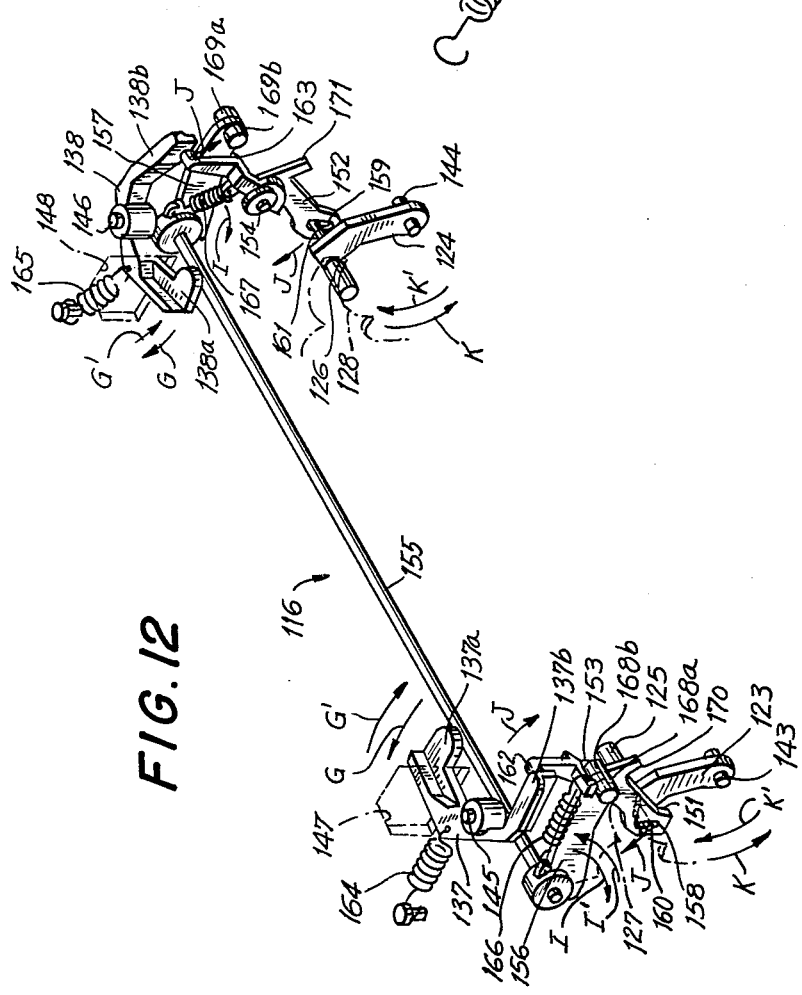
FIG. 12 is a perspective view of a cassette-dropping assembly associated with the magazine of the automatic cassette changer for causing the cassettes to drop, one at a time, from the bottom of the stack of cassettes in the magazine.

When cassette drop driving gear 172 is rotated in the direction of arrow H on FIG. 14 against the force of return spring 176, pin 168a is displaced toward the center of cassette drop driving gear 172 by the cam action of surface 175, with the result that actuating lever 156 is angularly displaced in the direction of arrow I on FIGS. 12 and 14 and the other actuating lever 157 is angularly displaced in the same direction by means of interlocking shaft 155. During angular displacement of actuating levers 156 and 157 in the direction of arrows I, pins 168b and 169b act on oblique arms 170 and 171 of interlocking levers 151 and 152, respectively, so that the latter are pivotally moved in the directions of the arrows J on FIGS. 12 and 14 against the forces of springs 166 and 167. By means of the interengagement of pins 160 and 161 in slots 158 and 159, cassette dropping levers 123 and 124 are pivotally displaced in the direction of the arrows K on FIGS. 11, 12 and 14 in response to the movements of levers 151 and 152 in the directions of the arrows J. At the same time, projections 162 and 163 on levers 151 and 152 slide along, and push outwardly against bent arms 137b and 138b of cassette supporting levers 137 and 138, respectively, whereby levers 137 and 138 are pivoted in the directions of the arrows G' on FIGS. 10 and 12 against the forces of return springs 164 and 165, respectively. When cassette drop driving gear 172 has turned through a predetermined angle in the direction of H on FIG. 14, an end face 178a of holderdown driving gear 178 abuts against a stop in the form of a screw 179 to mounting board 105, thereby to prevent further rotation of gear 172.

The pivotal movements of cassette dropping levers 123 and 124 in the directions of the arrows K cause the cassette supporting projections 125 and 126 thereof to be moved backward and downwardly along arcuate slots 127 and 128 to the inoperative positions indicated in broken lines on FIG. 15. At the same time, cassette supporting levers 137 and 138 are pivoted in the directions of the arrows G' on FIG. 12, whereby their flanged-end portions 137a and 138a are inserted substantially horizontally into magazine 61 from the back side thereof so as to attain operative positions indicated in broken lines on FIGS. 10 and 15. As indicated in FIG. 15 in respect to end portion 138a of lever 138, end portions 137a and 138a of cassette supporting levers 137 and 138, when in their operative positions, are inserted between the lowermost cassette 66A in magazine 61 and the cassette 66B immediately thereabove. The lid 180 of each of the cassettes, which is at the back of the latter as stored in the magazine, is provided with a beveled upper edge 181 so as to facilitate the smooth insertion of the flanged-end portions 137a and 138a between successive cassettes in magazine 61 when cassette supporting levers 137 and 138 are moved to their operative positions.

Figure 6:
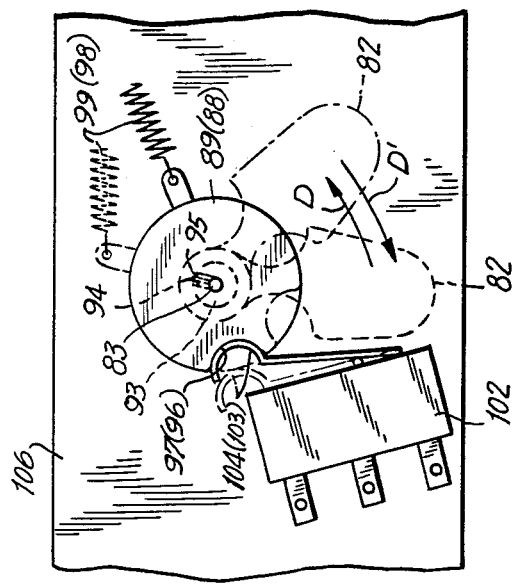
FIG. 6 is an enlarged, detailed view, taken along the line 6—6 on FIG. 5.

As shown on FIG. 16, the movements of cassette supporting projections 125 and 126 in the rearward direction to the back ends of respective slots 127 and 128 causes such projections 125 and 126 to act against cassette insertion detecting members 81 and 82 for simultaneously pivoting the latter in the direction of the arrow D on FIGS. 6 and 16. Thus, cassette insertion detecting switches 101 and 102 are again simultaneously turned ON and, as a result thereof, feed rollers 64 are rotated in the direction of arrow B in response to suitable operation of second motor 72.

When cassette supporting projections 125 and 126 are moved in the direction of arrow K from the position shown on FIG. 15 to the position shown on FIG. 16, projections 125 and 126 move out from under the rear portion of the lowermost cassette 66A in magazine 61 so that, as indicated in full lines on FIG. 16, the rear portion of the lowermost cassette 66A is dropped onto feed rollers 64 in the cassette loading and unloading passage 63. Since feed rollers 64 are then being rotated in the direction of arrow B, the dropped rear portion of cassette 66A is driven by feed rollers 64 so as to move generally in the direction of the arrow C. During such movement, the forward portion of cassette 66A moves off cassette bearers 121 and 122 onto the adjacent cassette guiding levers 139 and 140 which, due to the weight of the cassette, are made to tilt in the direction of the arrow M against the bias of the previously mentioned return springs 142. Such tilting of the cassette eject levers 139 and 140 is limited generally to the position shown in broken lines on FIG. 16, for example, by abutment by a lug 183 integral with each of levers 139 and 140 with a portion 184 of the adjacent cassette bearer 121 or 122. Thus, the forward portion of the dropped cassette 66A is smoothly guided downwardly along the inclined guide levers 139 and 140 for ensuring the movement of such cassette 66A in the direction of the arrow C and avoiding positively the inadvertent dropping of the cassette 66A onto discharged cassette receiver 62.

During the above-described dropping or removal from magazine 61 of the lowermost cassette 66A therein, the next cassette 66B in magazine 61 is supported, at the opposite ends of its rear portion, on flanged ends 137a and 138a of cassette supporting levers 137 and 138, and thus is prevented from dropping with the underlying cassette 66A. When the lowermost cassette 66A has been dropped and then moved by driven feed rollers 64 so as to displace its forward portion off cassette bearers 121 and 122, the forward portion of the next cassette 66B drops by a distance equal to the thickness of a cassette and comes to rest on cassette bearers 121 and 122. Thus, so long as any cassette remains in magazine 61, the forward portion of the lower most cassette in the magazine will act on end portion 131a of lever 131 and thus urge cassette detection switch 133 (FIG. 17) to its ON state.

Shortly after cassette drop driving gear 172 has started its rotation in the direction of arrow H on FIG. 14, a motor stop switch (not shown) is actuated by a lug 182 on gear 172 so as to temporarily halt operation of second motor 72. However, by reason of the inertia in a hereinafter described gear transmission by which motor 72 drives gear 172, cassette drop driving gear 172 continues to rotate in the direction of arrow H after the operation of motor 72 is temporarily halted, and the turning or rotation of gear 172 in the direction of arrow H is only arrested when end face 178a on holder-down driving gear 178 abuts screw 179. Thereafter, by shifting of the gear transmission, as will be hereinafter described in detail, cassette drop driving gear 172 is returned, substantially instantaneously, to the returned position shown in full lines on FIG. 14, whereupon the previously-mentioned motor stop switch (not shown) is released and motor 72 again causes rotation of feed rollers 64 in the direction of arrow B on FIG. 16. As a result of the foregoing, the dropped cassette 66A is moved rearwardly through passage 63 and inserted in the raised cassette holder 65.

In response to the return of cassette drop driving gear 172 to the position shown on FIG. 14, actuating levers 156 and 157 are returned in the directions of the arrows I' on FIGS. 12 and 14 by means of springs 166 and 167, respectively. As a result of the foregoing, cassette dropping levers 123 and 124 are returned in the direction of arrows K' on FIGS. 11, 12 and 14 and, at the same time, cassette supporting levers 137 and 138 are returned in the direction of arrows G on FIGS. 10 and 12 by return springs 164 and 165. Thereby, cassette supporting projections 125 and 126 are returned to the operative positions indicated in full lines on FIG. 15 and, at the same time, the flanged-end portions 137a and 138a of cassette supporting levers 137 and 138 are withdrawn rearwardly from magazine 61. As a result of the foregoing, the cassette 66B, which is now the lowermost cassette in magazine 61, assumes the substantially horizontal position of cassette 66A on FIG. 15.

Figures 18, 19:
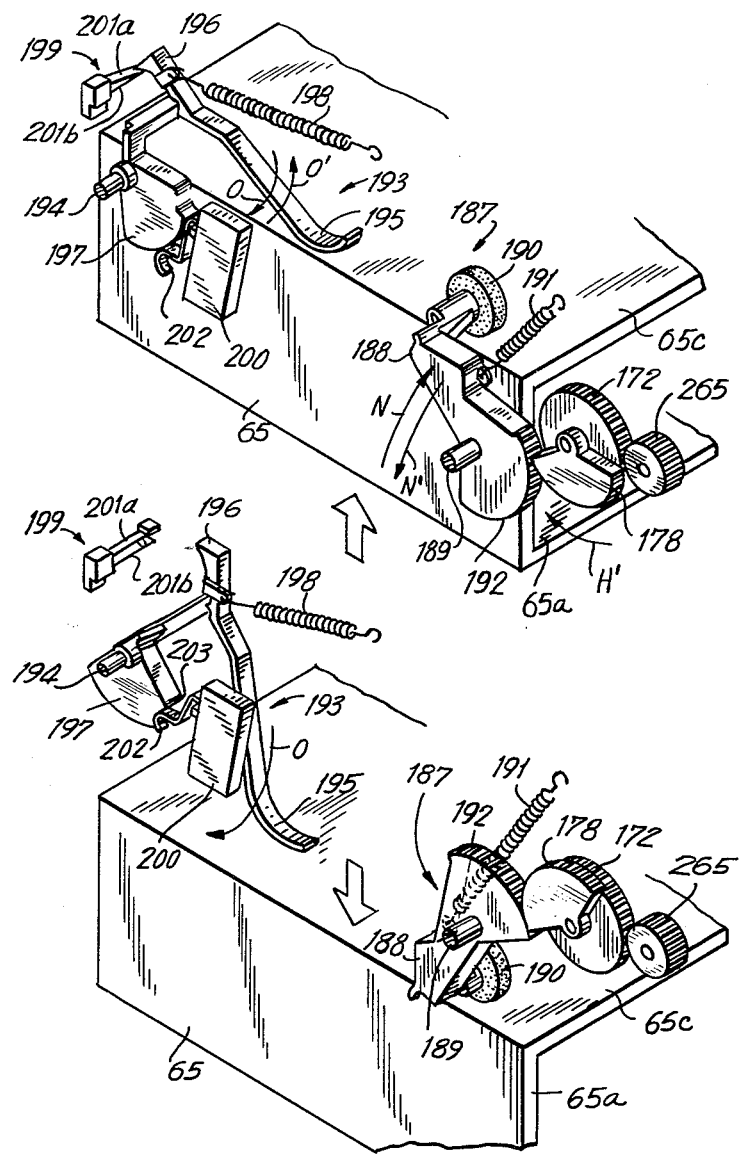
FIGS. 18 and 19 are fragmentary perspective views illustrating devices provided in the automatic cassette changer for effecting movement of a cassette holder of the associated VTR between its raised and lowered positions, and for detecting the position of such cassette holder.
Figure 20:
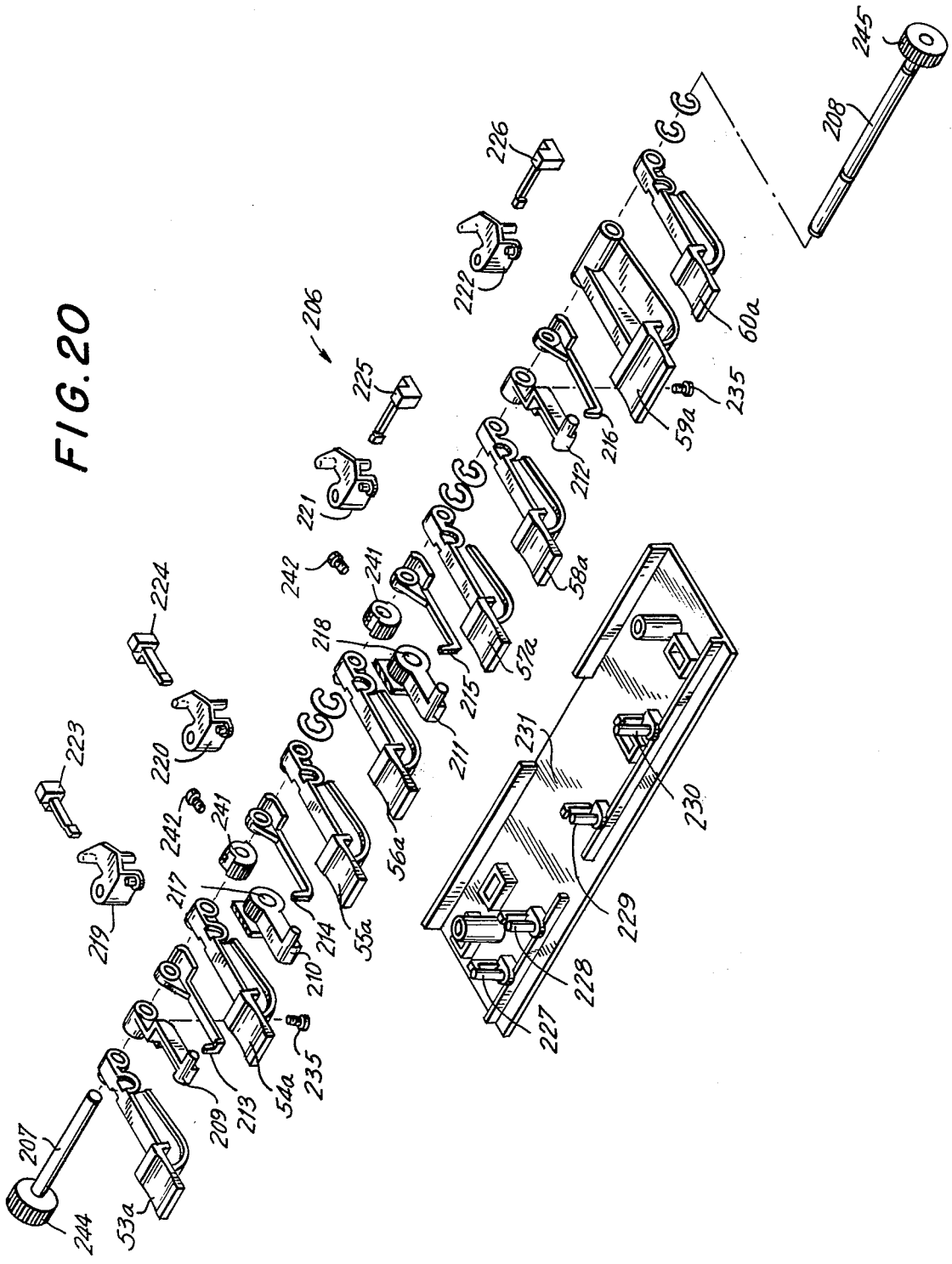
FIG. 20 is an exploded perspective view of the elements included in a push-button assembly of the automatic cassette changer.
Figure 21:
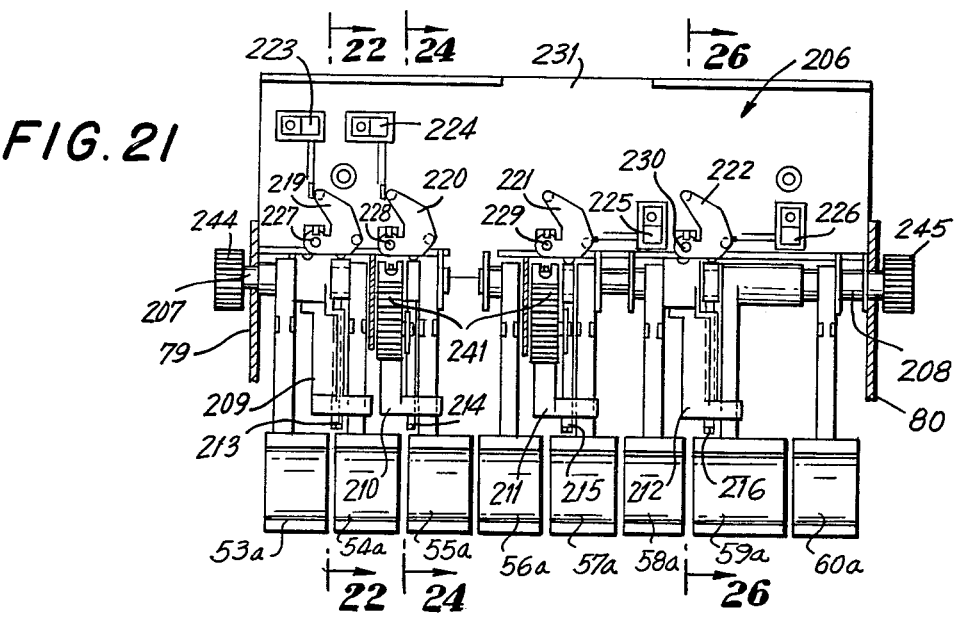
FIG. 21 is a top plan view of the push-button assembly in its assembled condition.
Figure 22:
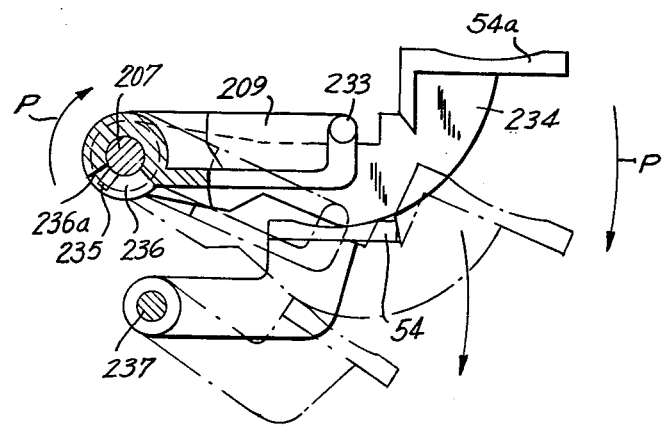
FIG. 22 is an enlarged sectional view taken along the line 22—22 on FIG. 21 for showing an eject push-button assembly of the automatic cassette changer and its relationship to an underlying eject button of the VTR.

Referring now to FIGS. 18 and 19, it will be seen that the automatic cassette changer 52 according to this invention further comprises a holder-down actuator 187 which includes a holder actuating lever 188 pivotally connected to the housing 52a by means of a pivot shaft 189 so as to be swingable in a vertical plane at one side of cassette holder 65 when changer 52 is mounted on VTR 51. A rubber roller 190 is rotatably mounted at one end of lever 88 for rolling engagement with an upper surface 65c of cassette holder 65. A return spring 191 is connected to lever 188 for urging the latter in the direction of the arrow N. The end portion of lever 88 remote from roller 190 is in the form of a sector gear 192 which is adapted to mesh with holder-down driving gear 178. A holder position detecting member 193 is also pivotally mounted in housing 52a by way of a shaft 194 so as to be disposed above cassette holder 65 when changer 52 is mounted on VTR 51. The holder position detecting member 193 is shown to include, as integral parts thereof, a holder detection arm 195 engageable with the upper surface 65c of cassette holder 65, a dswitch actuating arm 196 and a switch actuating cam 197. The holder position detecting member 193 is pivotally biased in the direction of the arrow O on FIG. 18 by means of a spring 198 so that arm 195 is held in contact with upper surface 65c of the cassette holder. The switch actuating arm 196 and switch actuating cam 197 are respectively associated with a holder-up detection switch 199 and a holder-down detection switch 200 suitably supported within housing 52a. More particularly, switch actuating arm 196 is operative to turn ON holder-up detection switch 199 by pressing together a pair of leaf contacts 201a and 201b of the latter only so long as cassette holder 65 is in its raised position shown on FIG. 18. The holder-down detection switch 200 is provided with an actuator 202 which is urged against the peripheral surface of switch actuating cam 197. Such peripheral surface of cam 197 has a recessed portion 203 engaged by actuator 202 to turn ON holder-down detecting switch 200 only when cassette holder 65 is in its downward or lowered position shown on FIG. 19. However, in all other positions of holder 65, for example, when holder 65 is in its up or raised position of FIG. 18, actuator 202 is forced from recessed portion 203 onto the radially larger portion of the peripheral surface of cam 197 so as to turn OFF detection switch 200.

As previously noted, holder-down driving gear 178 is integral with cassette drop driving gear 172 so that, when cassette drop driving gear 172 is returned to the position shown on FIG. 14 after completion of the dropping into passage 63 of the lowermost cassette in magazine 61 and the feeding of such dropped cassette into raised holder 65, holder-down driving gear 178 comes into meshing engagement with sector gear 192 (FIG. 18). Thereafter, turning of gears 172 and 178 in the direction of the arrow H' on FIG. 18 causes pivotal movement of holder actuator lever 188 in the direction of arrow N' against the force of return spring 191 so that roller 190 presses downwardly on the upper surface of cassette holder 65 and forces the latter to its down or lowered position shown on FIG. 19. During such downward movement of cassette holder 65, holder detection arm 195 is made to pivotally follow the same by return spring 198. Thus, when holder 65 reaches its down or lowered position, switch 200 is turned ON to detect the same.

When cassette holder 65 attains its down or lowered position, a lock mechanism (not shown) of the VTR secures the cassette holder in such lowered position until the eject button 54 of the VTR is subsequently depressed, whereupon the lock mechanism of the VTR is released and the cassette holder 65 is forced to return to its up or raised position shown in FIG. 18 by suitable mechanisms within VTR 51 which form no part of the present invention. After cassette holder 65 has been moved downwardly to its lowered position shown on FIG. 19 and locked in such position, holder-down driving gear 178 and cassette drop driving gear 172 are returned by spring 176 on FIG. 14 in the direction of the arrow H from the position shown on FIG. 19 to that shown on FIGS. 14 and 18. In the course of such return movement of gear 178, holder actuating lever 188 is restored to the position shown on FIG. 18 by return spring 191 so that roller 190 will not interfere with the subsequent upward movement of holder 65 to its raised position when eject button 54 is actuated or depressed.

In the course of the upward movement of cassette holder 65 in response to actuation of eject button 54, holder position detecting member 193 is pivoted in the direction of the arrow O' on FIG. 18 in opposition to the force of spring 198, and actuator 202 is moved out of recessed portion 203 of cam 192 so that holder-down detecting switch 200 is turned OFF. When cassette holder 65 attains its raised position shown on FIG. 18, switch actuating arm 196 turns ON holder-up detection switch 199 for detecting the fully raised condition or state of holder 65.

Referring now to FIGS. 20-28, it will be seen that a push-button actuating assembly 206 is provided in changer 52 and includes two push-button supporting shafts 207 and 208 arranged co-axially between side plates 79 and 80 and being rotatably supported under the forward portion of bottom plate 78 of the cassette loading and unloading passage 63. As shown particularly on FIG. 21, pause push-button 53a, eject push-button 54a and rewind push-button 55a are pivotally mounted on shaft 207, while stop push-button 56a, reproducing push-button 57a, fast-forward push-button 58a, recording push-button 59a and audio dubbing push-button 60a are pivotally mounted on shaft 208. Push-button actuating levers 209, 210, 211 and 212 paired with push-button detection levers 213, 214, 215 and 216, respectively, are disposed at one side of eject push-button 54a, rewind push-button 55a, reproducing push-button 57a and recording push-button 59a, respectively. Push-button actuating lever 209 and push-button detection levers 213 and 214 are pivotally mounted on shaft 207, and push-button actuating lever 212 and push-button detection levers 215 and 216 are pivotally mounted on shaft 208. However, push-button actuating levers 210 and 211 are pivotally mounted on supporting shafts 217 and 218, respectively, which are disposed in parallel, offset relation to shafts 207 and 208, respectively. Further, switch actuating levers 219, 220, 221 and 222 are associated with push-button detection levers 213, 214, 215 and 216, respectively, and are adapted to actuate push-button detection switches 223, 224, 225 and 226, respectively. Switch actuating levers 219, 220, 221 and 222 are mounted on respective pivot pins 227, 228, 229 and 230 which may be molded integrally with a bottom wall or pan 231 which also suitably supports the push-button detection swtiches 223-226.

The manner in which actuating lever 209 cooperates with eject push-button 54a is the same as the manner in which actuating lever 212 cooperates with recording push-button 59a. Therefore, only the cooperation of actuating lever 209 with eject push-button 54a will be described with reference to FIGS. 22 and 23 in which a lateral projection 233 is shown to be integrally formed at a free forward end of lever 209 so as to be engageable, from above, with the upper surface of a lever portion 234 of eject push-button 54a. A pin 235 is fixed to rotatable shaft 207 and extends radially in a circumferentially elongated hole or slot 236 formed in a hub portion of lever 209 rotatable on shaft 207. Thus, there is a lost-motion connection between shaft 207 and actuating lever 209 and, as a result thereof, when shaft 207 is rotated in the forward direction indicated by the arrow P, pin 235 abuts one end of hole 236 to angularly displace lever 209 in the same direction. As a result of such angular displacement of lever 209, projection 233 thereon acts downwardly against lever portion 243 of eject push-button 54a which is thereby depressed to the position shown in broken lines on FIG. 22. Further, eject button 54 of VTR 51, being disposed below eject push-button 54a, is similarly pivoted downwardly about a supporting shaft 237 by the engagement of the lower surface of lever portion 234 with button 54.

The actuating structure for rewind push-button 55a is substantially the same as that provided for the reproducing push-button 57a so that only the actuating structure for the rewind push-button 55a will be described in detail with reference to FIGS. 24 and 25. As there shown, a lateral projection 210' is integrally formed with the tip or free end of push-button actuating lever 210 and engages from above with the upper surface of a lever portion 238 of rewind push-button 55a. A sector gear 239 is formed on the outer periphery of the hub portion of push-button actuating lever 210 which is rotatably mounted on shaft 217, and a sector gear 240 meshing with sector gear 239 is formed on the periphery of a sleeve 241 which is rotatable on shaft 207. A pin 242 fixed to rotatably shaft 207 extends radially in a circumferentially elongated hole or slot 243 formed in sleeve 242 to provide a lost-motion connection between shaft 207 and sleeve 241.

Figure 24:
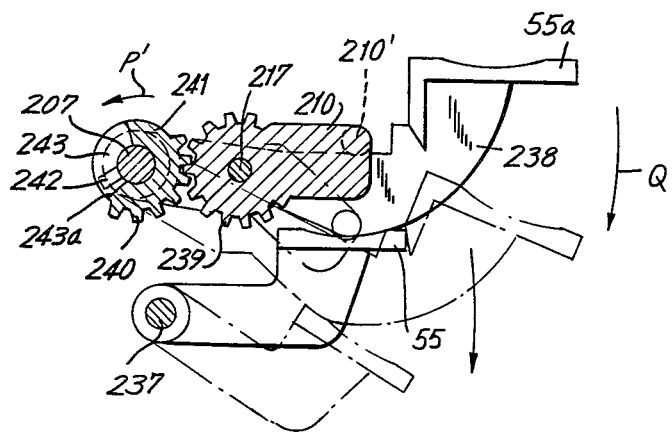
FIG. 24 is a sectional view taken along the line 24—24 on FIG. 21 for showing a rewind push-button assembly of the automatic cassette changer and its relation to an underlying rewind push-button of the VTR.
Figure 25:
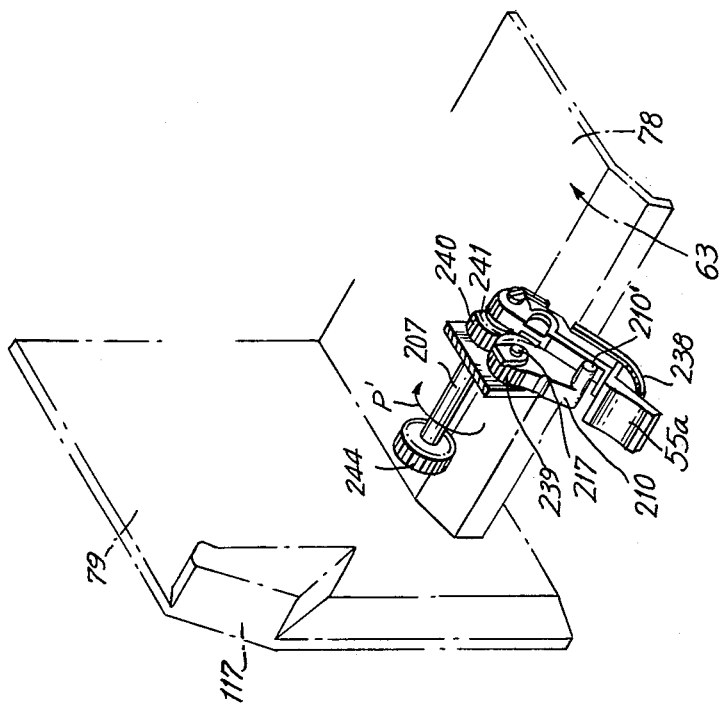
FIG. 25 is a perspective view similar to that of FIG. 23, but illustrating the automatic depressing of the rewind push-button assembly.
Figure 23:
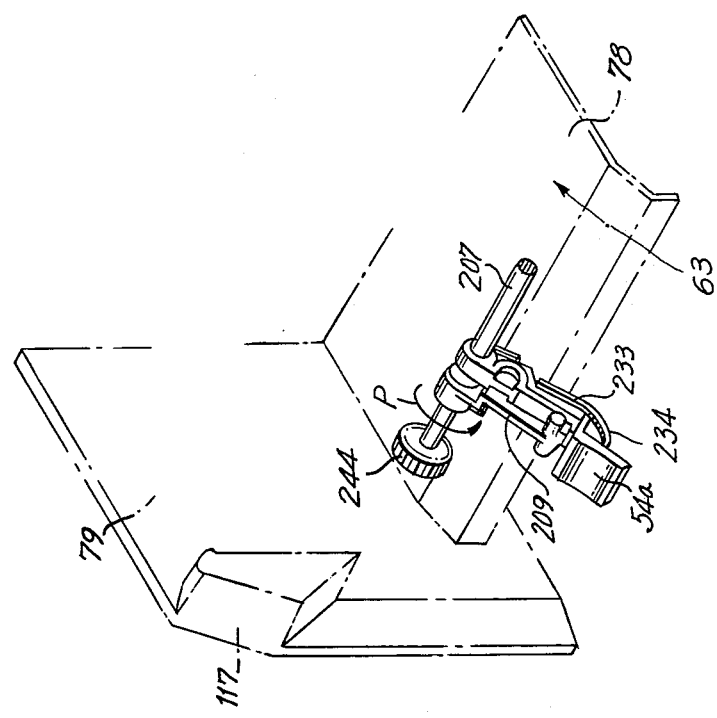
FIG. 23 is a fragmentary perspective view illustrating the manner in which the eject push-button assembly of the cassette changer is automatically depressed in the course of its operating cycle.

When shaft 207 is rotated in the reverse direction indicated by the arrow P' on FIGS. 24 and 25, pin 242 comes into abutment with an end 243a of slot 243 to turn sleeve 241 in the same direction and, by reason of the meshing engagement of sector gears 239 and 240, push-button actuating lever 210 is turned or angularly displaced in the opposite direction indicated by the arrow Q. Angular displacement of lever 210 in the direction of arrow Q causes its projection to 210' to push downwardly on lever portion 238 so that rewind push-button 55a is pivoted downwardly or depressed. By reason of the foregoing, rewind button 55 of VTR 51, being disposed below rewind push-button 55a, is pushed downwardly by the lower surface of lever portion 238 so as to be pivoted about shaft 237 to its depressed position indicated in broken lines on FIG. 24.

The pins 235 and 242 fixed to shaft 207 are angularly positioned relative to each other and relative to the respective slots 236 and 234 so that, when shaft 207 is rotated in the forward direction indicated by arrow P for depressing push-button 54a, pin 242 moves within slot 243 without displacing lever 210 and, when shaft 207 is rotated in the reverse direction indicated by arrow P' for depressing push-button 55a, pin 235 moves along slot 236 without displacing actuating lever 209. A gear 244 (FIGS. 21, 23 and 25) is secured to the end of shaft 207 directed away from shaft 208, and is adapted to be driven by second motor 72 by way of a gear transmission hereinafter described in detail, so as to turn shaft 207 in the forward direction of arrow P or in the reverse direction of arrow P'. Further, such gear transmission for shaft 207 is arranged so that, after shaft 207 has been turned in the direction of arrow P or P' for depressing the eject push-button 54 or the rewind push-button 55, respectively, in the manner described above, shaft 207 is returned in the direction of arrow P' or arrow P, respectively, to the position indicated in full lines on FIGS. 22 and 24. As shown on FIGS. 21 and 34, a gear 245 is similarly fixed on the end of shaft 208 remote from shaft 207 and is adapted to be driven by third motor 73 through a gear transmission hereinafter described in detail for turning shaft 208 selectively in the direction of the arrow P or in the direction of the arrow P' for depressing the recording push-button 59a or the reproducing push-button 57a, respectively.

When any one of the eject push-button 54a, rewind push-button 55a, reproducing push-button 57a and recording push-button 59a is selectively depressed, the corresponding push-button detection lever 213, 214, 215 or 216 is angularly displaced to turn ON the corresponding push-button detection switch 223, 224, 225 or 226 by means of the respective switch actuating lever 219, 220, 221 or 222. The switches 223, 224, 225 and 226 are all operated in the same manner so that only the operation of switch 226 associated with recording push-button 59a will be described in detail herein with reference to FIGS. 26–28.

The free end of push-button detection lever 216 remote from shaft 208 abuts the upper surface of the recording button 59 of VTR 51 which is disposed below a lever portion 247 of recording push-button 59a. A flange 248 is directed laterally from lever 216 at the portion of the latter pivoted on shaft 208, and such flange 248 engages the lower surface of lever portion 247. A protrusion 249 extends rearwardly from an edge of flange 248 and is engageable with a projection 250 extending from switch actuating lever 222. The protrusion 249 and projection 250 cooperate to form a click mechanism 251 for relatively lightly holding detection lever 216 and switch actuating lever 222 in their positions shown in broken lines on FIGS. 26 and 27, respectively.

Figure 26:
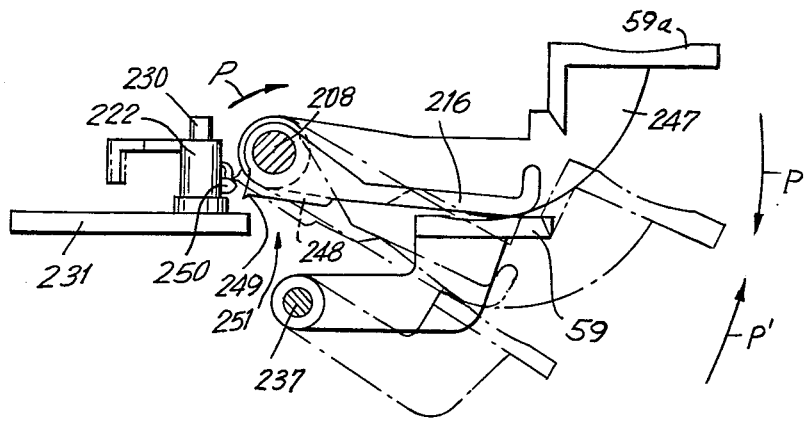
FIG. 26 is a sectional view taken on the line 26—26 of FIG. 21 for illustrating a recording push-button assembly of the automatic cassette changer and its relation to an underlying recording push-button of the VTR.
Figure 27:
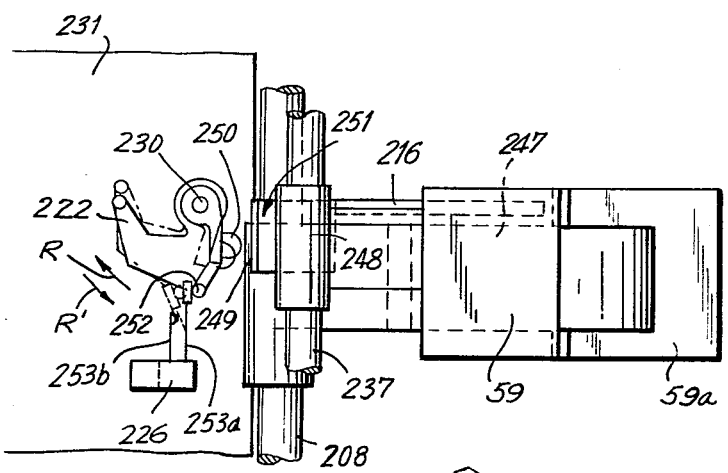
FIG. 27 is a bottom plan view of the assembly shown on FIG. 26.

It will be apparent that, when recording push-button 59a is pivotally depressed in the direction of arrow P on FIG. 26, recording button 59 of the VTR is similarly depressed and flange 248 is acted upon by the lower surface of lever portion 247 for angularly displacing push-button detection lever 216 in the direction of arrow P. Just before recording button 59 is completely depressed by push-button 59a, protrusion 249 of lever 216 engages and pushes against projection 250 of switch actuating lever 222 so that the latter is pivotally displaced in the direction of arrow R on FIGS. 27 and 28. Upon such displacement of actuating lever 222 in the direction of arrow R, a pin 252 depending integrally from lever 222 presses together a pair of leaf contacts 253a and 253b of switch 226 so as to turn ON the latter. When recording button 59 is completely depressed, as indicated in broken lines on FIG. 26, protrusion 249 of detection lever 216 goes over projection 250 with a snap or clicking action so that, thereafter, push-button detection lever 216 is lightly held in the position shown in broken lines on FIG. 26 by means of the resilient engagement between protrusion 249 and projection 250. Further, the resulting turning ON of push-button detection switch 226 is effective to indicate or detect that the associated recording button 59 has been depressed for selecting the recording mode of operation of VTR 51.

The recording button 59 of VTR 51 is locked in its depressed position by a conventional locked mechanism (not shown) of the VTR until stop button 56 is depressed either manually or automatically, but recording push-button 59a of automatic cassette changer 52 is not at all locked in its depressed position when moved thereto either manually or automatically. Therefore, after recording push-button 59a has been depressed, a mischievous child can freely lift push-button 59a without affecting push-button detection lever 216. In other words, if depressed push-button 59a is manually raised, the respective push-button detection lever 216 remains in the position indicated in broken line on FIG. 26 so that push-button detection switch 226 continues in its ON condition for indicating the maintenance of the recording mode of operation.

When a recording operation of VTR 51 is completed and recording button 59 is unlocked either automatically or in response to manual actuation of stop button 56, the unlocked recording button 59 is resiliently urged upwardly in the direction of arrow P' on FIG. 26 and pushes up recording push-button 59a and the respective push-button detection lever 216. As a result, protrusion 249 clicks downwardly past projection 250 to release the resilient interengagement thereof, and push-button detection lever 216 is returned to the position shown in full lines on FIG. 26. Further, switch actuating lever 222 is returned in the direction of arrow B' by the resilience of leaf contact 253a so as to turn OFF push-button detection switch 226.

Referring now to FIGS. 29–33, it will be seen that a gear transmission 256 is included in automatic cassette changer 52 for transmitting driving torque from second motor 72 to gears 113, 144 and 172. More particularly, gear transmission 256 is shown to include a driving gear 258 fixed on a shaft 257 which is journaled in mounting board 105, and a motor gear 259 fixed on the shaft of second motor 72 which is secured on mounting board 105. A relatively large gear 260 meshes with motor gear 259 and is integral with a small gear or pinion 261 which meshes with a relatively large gear 262 integral with driving gear 258. At the lower side of gear 262, the latter meshes continuously with roller driving gear 113. Thus, roller driving gear 113 is rotated whenever motor 72 is operated, with the direction of rotation of gear 113 being dependent upon the direction of rotation of the shaft of reversible motor 72.

Relatively large diameter intermediate gears 263 and 264 are journaled in mounting board 105 above and below, respectively, shaft 257 of driving gear 258, and such intermediate gears 263 and 264 are axially displaced from each other. A relatively small gear or pinion 265 is integral with the upper intermediate gear 263 and is continuously in mesh with cassette drop driving gear 172. A relatively small gear or pinion 266 is integral with the lower intermediate gear 264 and meshes with a relatively large diameter gear 267 also journaled in mounting board 105. Gear 267 is integral with a relatively small diameter gear or pinion 268 which is in continuous meshing engagement with push-button driving gear 244.

A shifting lever 269 is pivotally mounted on shaft 257, and integral shifting gears 270 and 271 and a shifting gear 272 are journaled in shifting lever 269 so that shifting gears 270 and 272 are continuously in mesh with driving gear 258 at the top and bottom of the latter. When shifting lever 269 is pivotally displaced in the direction of arrow S on FIG. 29, shifting gear 271 is engaged with intermediate gear 263 and, when shifting lever 269 is pivoted in the direction of arrow S', shifting gear 272 engages intermediate gear 264. Thus, pivoting of shifting lever 269 in the direction of the arrow S is effective to transmit the torque of motor 72 to cassette drop driving gear 172, whereas pivoting of shifting lever 269 in the direction of arrow S' is effective to transmit the torque of motor 72 to push-button driving gear 244, with the torque of motor 72 being transmitted to roller driving gear 113 at all times. As shown particularly on FIG. 30, a hole 273 is formed in shifting lever 269 around shaft 257 for accomodating driving gear 258. Further, a return spring 274 is connected to shifting lever 269 for urging the latter about shaft 267 to the neutral position shown on FIG. 29. The gear 267 is also biased by a return spring 275 to return shaft 207 to the position shown on FIGS. 22 and 24 when gear 272 is disengaged from gear 264.

At one side portion of housing 52a, a slide bar 276 is mounted for rectilinear sliding movement in the direction of its longitudinal axis, and a vertically elongated hole 277 is formed in the front end portion 276a of slide bar 276 for receiving a pin 279 mounted adjacent the back end of a change-over lever 278. The rear end portion of shifting lever 269 has a generally Y-shaped hole 280 formed therein for receiving a pin 281 which is mounted at the forward end of change-over lever 278. Such change-over lever 278 is pivotally mounted, at a position spaced downwardly from pin 279, on a pivot shaft 283 which is carried by a mounting bracket 282. Such mounting bracket 282, which is suitably fixed relative to mounting board 105 and spaced outwardly from the latter, is also operative to support the outer ends of shaft 257 and the shafts of other gears included in transmission 256.

The above-described gear transmission 256 is effective to selectively establish the previously described first, second and third conditions corresponding to respective modes of changer 52 in response to longitudinal displacement of slide bar 276 to respective positions in the longitudinal direction thereof. More particularly, in the condition shown on FIG. 29 determined by the disposition of slide bar 276 at its neutral position $P_1$, pin 281 of change-over lever 278 is positioned within a central portion 280a of Y-shaped hole 280. In the resulting position of shifting lever 269, gears 271 and 272 are disengaged from the intermediate gears 263 and 264, respectively, for interrupting the transmission of torque from driving gear 258 to such intermediate gears 263 and 264, while the torque of second motor 72 can be transmitted from motor gear 259 to roller driving gear 113 by way of gears 260, 261 and 262. Thus, the condition shown on FIG. 29 corresponds to the cassette insertion and cassette discharge modes of changer 52 which are selectively effected in response to forward and reverse operation of second motor 72 for causing gear 113 to rotate in the directions of arrows B and B', respectively.

Figure 32:
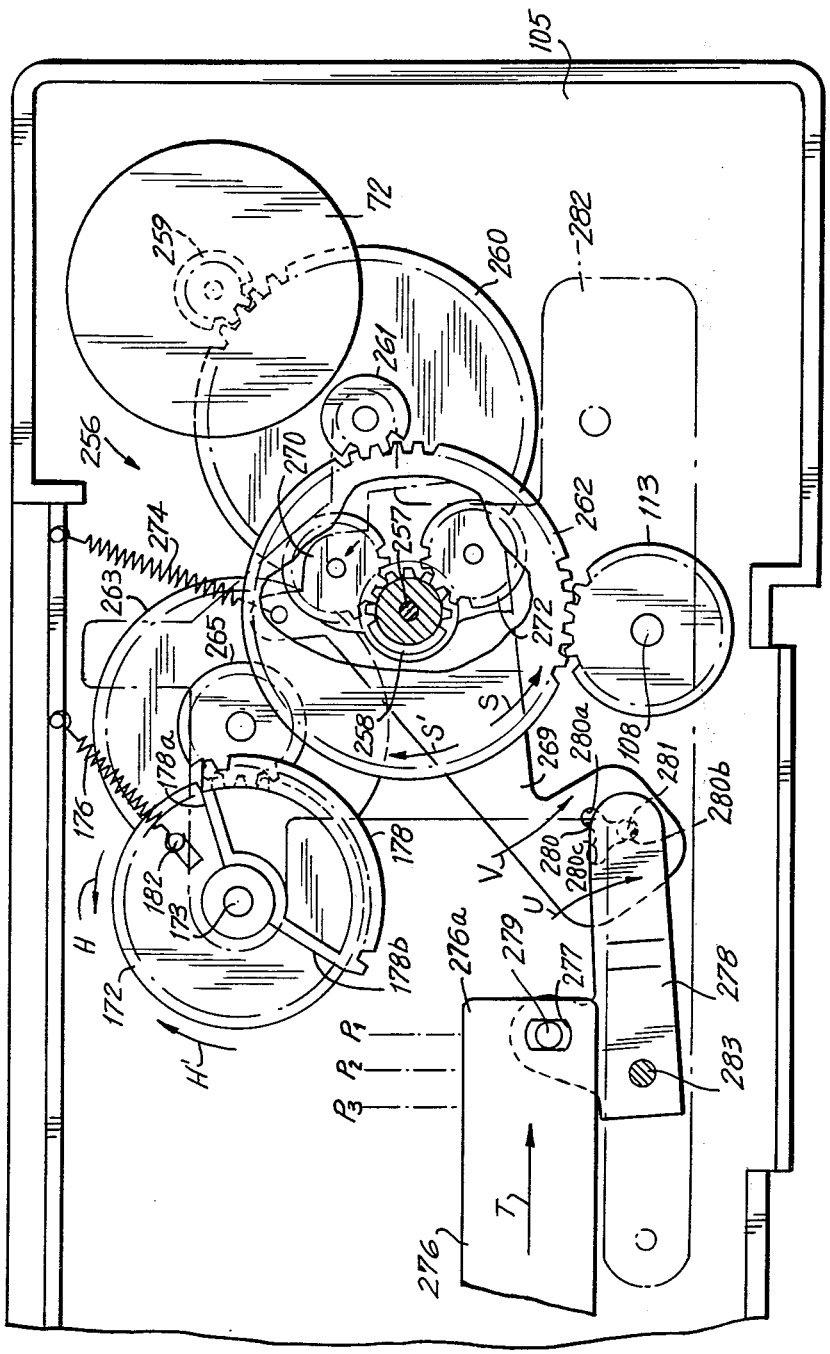
FIGS. 32 and 33 are views similar to that of FIG. 29, but showing the drive assembly in other shifted conditions for effecting other operating modes of the cassette changer.

For the condition shown on FIG. 32, slide bar 276 is longitudinally displaced in the direction of arrow T to a forward position $P_2$, whereby change-over lever 278 is angularly displaced in the direction of arrow U for pivoting shifting lever 269 in the direction of arrow V against the force of return spring 274, whereby pin 281 of change-over lever 278 lodges in the lower portion 280b of Y-shaped hole 280 for holding shifting lever 269 in the illustrated position. With shifting lever 269 in the position shown on FIG. 32, shifting gear 272 is disengaged from intermediate gear 264 and shifting gear 271 is brought into meshing engagement with intermediate gear 263. Thus, the torque of second motor 72 transmitted from motor gear 259 to driving gear 258 by way of gears 260, 261 and 262, is further transmitted to intermediate gear 263 through integral shifting gears 270 and 271. Thus, forward or reverse drive of second motor 72 then causes gear 265 integral with intermediate gear 263 to rotate cassette drop driving gear 172 selectively in the direction of arrow H or arrow H', respectively, for effecting either the cassette drop mode of operation or the holder-down mode of operation of changer 52.

Figure 33:
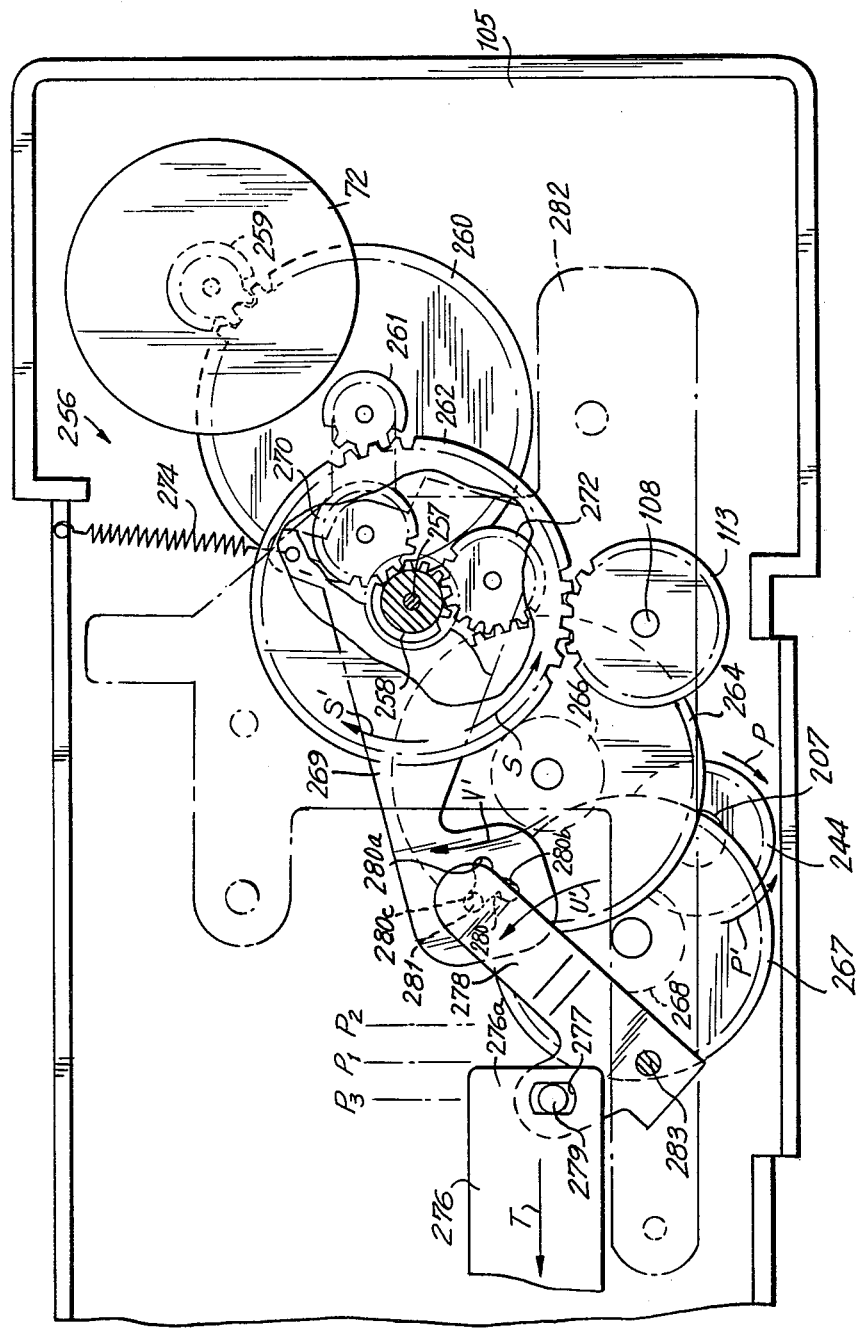

For the condition of gear transmission 256 shown on FIG. 33, slide bar 276 is longitudinally displaced in the direction of arrow T' to a rearward position $P_3$, so that change-over lever 278 is angularly displaced in the direction of arrow U' and, accordingly, shifting lever 269 is pivoted in the direction of the arrow V' with pin 281 of change-over lever 278 lodging in the upper portion 280c of Y-shaped hole 280 for holding lever 269 in the illustrated position. In such position of shifting lever 269, shifting gear 271 is disengaged from intermediate gear 263 to interrupt the transmission of torque between driving gear 258 and intermediate gear 263, while shifting gear 272 now meshes with intermediate gear 264. Therefore, in the condition shown on FIG. 33, the torque of second motor 72 transmitted to driving gear 258 from motor gear 259 by way of gears 260, 261 and 262, is further transmitted to push-button driving gear 244 by way of switching gear 272 and gears 264, 266, 267 and 268 for selecting the eject button depressing mode or the rewind button depressing mode of changer 52 in response to the forward or reverse drive, respectively, of second motor 72 and the corresponding rotation of gear 244 in the direction of the arrow P or in the direction of the arrow P', respectively.

Returning to FIG. 32, it will be seen that, in the condition there illustrated, when cassette drop driving gear 172 is turned in the direction of the arrow H or the arrow H', return spring 176 is tensioned. Therefore, after cassette drop driving gear 172 has been turned through a predetermined angle in either the direction of the arrow H or the arrow H' for effecting operaation of changer 52 in either its cassette drop mode or its holder-down mode, respectively, if slide bar 276 is returned to its neutral position $P_1$ (FIG. 29) for disengaging shifting gear 271 from intermediate gear 263, cassette drop driving gear 172 is returned to the position shown on FIG. 29 by the previously tensioned return spring 176. Similarly, in the condition shown on FIG. 33, when push-button driving gear 244 is turned in the direction of the arrow P or the direction of the arrow P', return spring 275 connected to gear 267 (FIG. 29) is tensioned. Therefore, after gear 244 has been turned to a predetermined angle, if slide bar 276 is restored to its neutral position $P_1$ in which shifting gear 272 is again disengaged from intermediate gear 264, push-button driving gear 244 is returned to a neutral position, for example, corresponding to the position of shaft 207 shown in full lines on FIGS. 22 and 24, by the force of tension springs 275 transmitted through gears 267 and 268.

Referring now to FIGS. 35-40, it will be seen that a mode selecting assembly 286 for selectively establishing the previously described first, second and third conditions of gear transmission 256 comprises a mounting plate of 287 suitably disposed within the rear portion of housing 52a and having first motor 72 secured thereon.

A shaft 288 is suitably journaled on a mounting plate 287 and carries a driving gear 289 having two radial cams 290 and 291 suitably secured to its underside. A motor gear 292 is secured on the shaft of motor 71, and the torque of the latter is transmitted to driving gear 289 by way of successive gears 293, 294, 295 and 296. More particularly, motor gear 292 meshes with gear 293 which is of relatively large diameter and integral with small diameter gear 294, and gear 295 is of relatively large diameter and meshes with gear 294, while gear 296 is integral with gear 295 and meshes with driving gear 289. A potentiometer 299 is mounted on a supporting bracket 298 which also supports the upper end of shaft 288 of driving gear 296. A gear 300 integral with driving gear 289 meshes with a gear 203 secured to a rotary shaft 301 of potentiometer 299 so that the resistance of potentiometer 299 will always have a value corresponding to the rotational position of shaft 288, and hence of cams 290 and 291.

A cassette eject lever 304 is pivotally mounted on the lower end portion of supporting shaft 288 below cams 290 and 291. A spring 305 (FIGS. 37-40) is connected between mounting plate 287 and lever 304 for pivotally urging the latter in the direction of the arrow W on FIG. 37. A pair of cam follower levers 306 and 307 are pivotally mounted below gears 295 and 296 on the lower portion of supporting shaft 297 at which the levers are made to intersect or cross. A spring 308 is connected, under tension, between arms 306a and 307a of the levers for pulling such lever arms towards each other, while the other arms of cam follower levers 306 and 307 have cam follower rollers 309 and 310, respectively, rotatable thereon and being urged against the peripheral surfaces of rotatable cams 290 and 291, respectively. A flange 276b is formed on the rear end of slide bar 276 and is held resiliently between the ends of arms 306a and 307a of the cam follower levers. In the mode selecting assembly 286 as described above, the torque of first motor 71 is transmitted from motor gear 292 to cam driving gear 289 by way of gears 293, 294, 295 and 296 so that, in response to the forward or reverse operation of motor 71, cams 290 and 291 are rotated together either in the direction of the arrow X or in the direction of the arrow X', respectively, on FIG. 37. During such turning of cams 290 and 291, rotary shaft 301 of potentiometer 299 is correspondingly turned by way of gears 300 and 302, so that the rotational position of cams 290 and 291 is detected by potentiometer 299 and can be controlled on the basis of such detection.

In dependence on the control of the direction and angle of rotation of cams 290 and 291 by first motor 71, slide bar 276 is disposed in a selected one of its three positions, namely, neutral position $P_1$(FIG. 37), forward position $P_2$ (FIG. 38), and rear position $P_3$ (FIG. 40), whereby any one of the previously described three conditions of shiftable gear transmission 256 can be selected.

Figure 37:
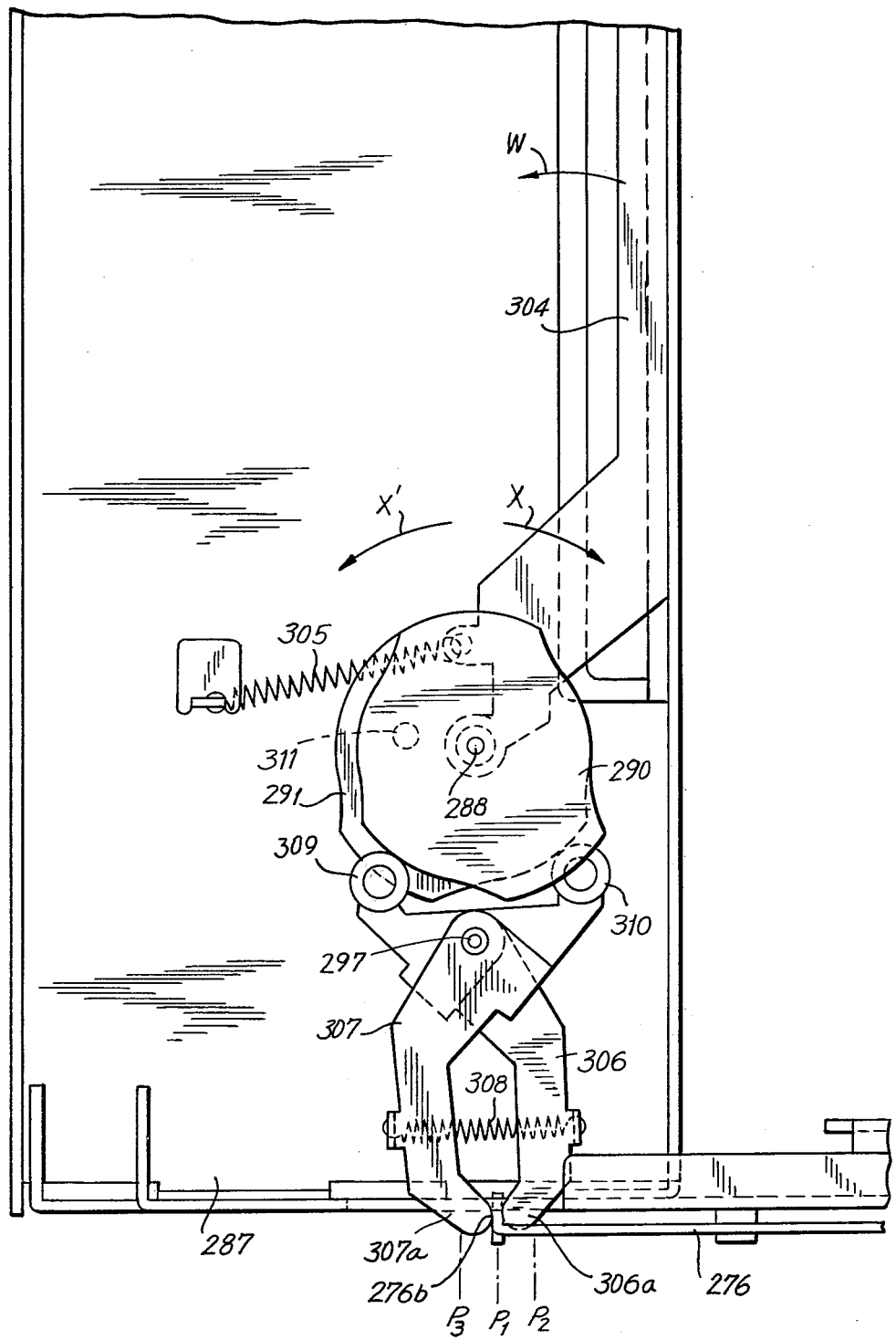
FIGS. 37, 38, 39 and 40 show the cam assembly of FIGS. 35 and 36 in various rotational positions thereof for selecting respective operating modes of the automatic cassette changer.
Figure 38:
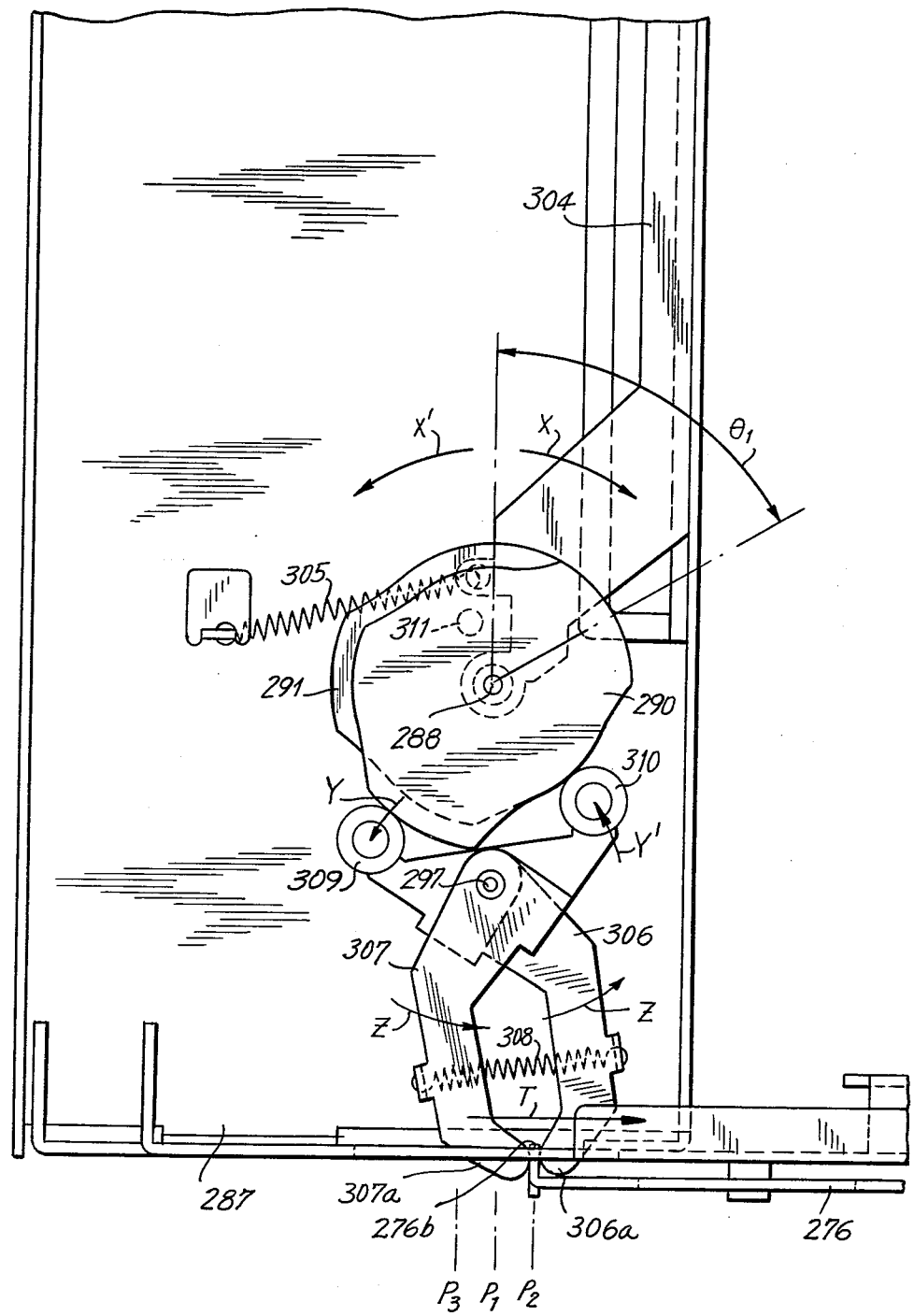

More particularly, with cams 290 and 291 in the positions shown in FIG. 37, cassette eject lever 304 is in its returned or stowed position and slide bar 276 is disposed at its neutral position $P_1$. When cams 290 and 291 are turned in the direction of arrow X through an angle $\theta_1$ in response to forward drive of first motor 71, as on FIG. 38, cam follower roller 309 is displaced in the direction of the arrow Y by cam 290 so as to move lever 306 pivotally in the direction of the arrow Z, while roller 310 is moved in the direction of arrow Y' in following the contour of cam 291 under the urging of spring 308, so that lever 307 also pivots in the direction of the arrow Z. As a result, flange 276b at the rear end of slide bar 276 is displaced in the direction of the arrow T to move slide bar 276 forwardly to position $P_2$.

In response to the movement of cam 291 through the angle $\theta_1$, a pin 311 depending from the lower surface of cam 291 is moved also in the direction of arrow X toward cassette eject lever 304 but does not displace the latter. Then, if after the lapse of a certain period of time, first motor 71 is rotated in the reverse direction, cams 290 and 291 are turned in the direction of the arrow X' to the neutral position shown on FIG. 37 and, accordingly, slide bar 276 is returned to its neutral position $P_1$.

Figure 39:
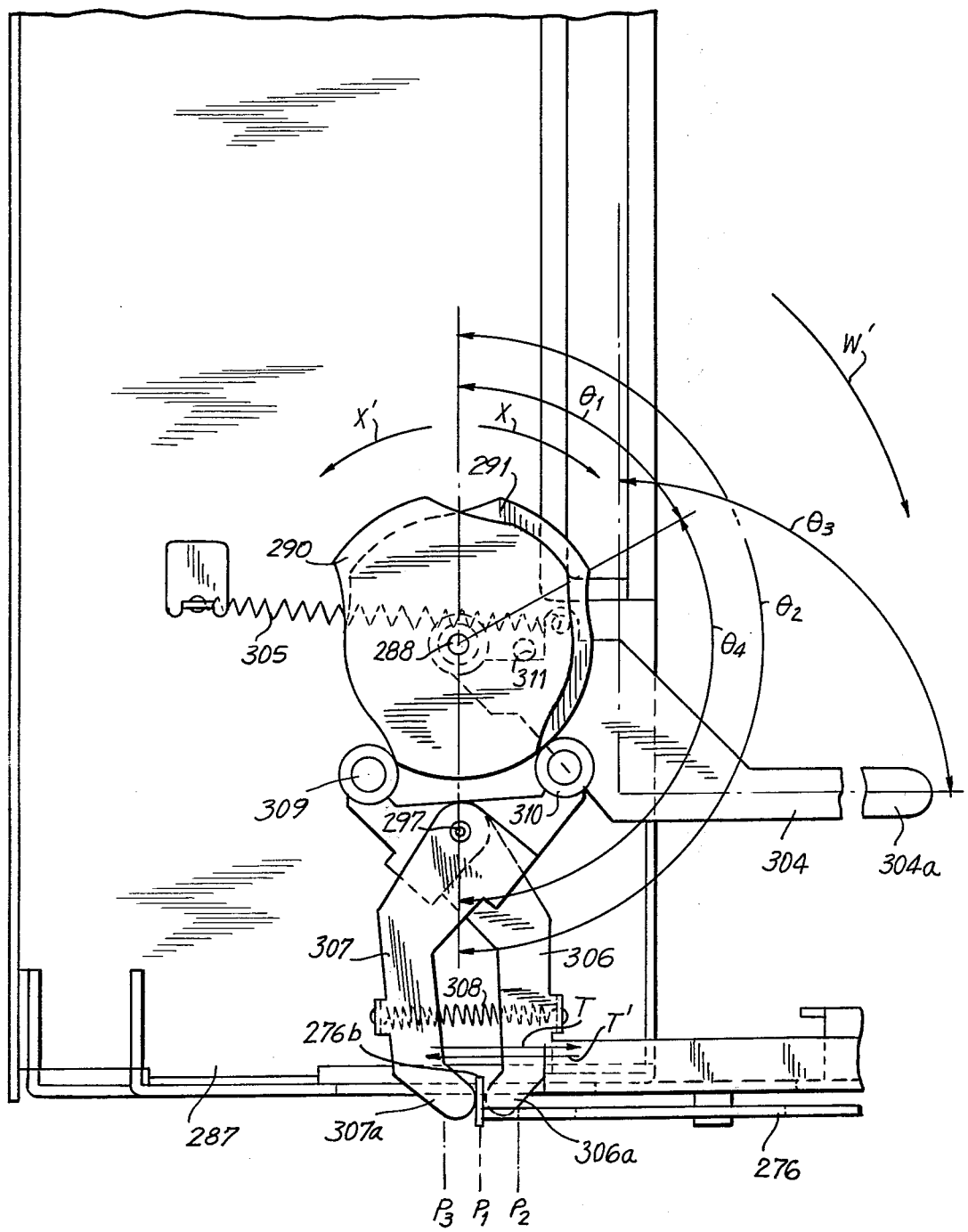

If first motor 71 is now operated in the forward direction for turning cams 290 and 291 in the direction of the arrow X through an angle $\theta_2$, as shown on FIG. 39, pin 311, in the course of such turning of cams 290 and 291, abuts against and pushes cassette eject lever 304 so that the latter is pivotally moved from its stowed position in the direction of the arrow W' through the angle $\theta_3$. During such pivoting of lever 304, the tip end portion 304a thereof can act against a cassette in the raised holder 65 for ejecting the latter from within cassette holder 65 into the cassette loading and unloading passage 63.

It will be noted that the cams 290 and 291 are shaped so that after the turning thereof through the angle $\theta_2$, the cam follower levers 306 and 307 are again disposed in their original or neutral positions shown on FIG. 37 for disposing slide bar 276 in its neutral position $P_1$. In other words, during the turning of cams 290 and 291 in the direction of the arrow X through the angle $\theta_1$, slide bar 276 is displaced in the direction of arrow T to its forward position $P_2$. However, upon further turning of cams 290 and 291 in the direction of the arrow X through the angle $\theta_4$, that is, through the total angle $\theta_2$, cam follower levers 306 and 307 are angularly displaced to cause movement of slide bar 276 in the direction of the arrow T' back to the initial position $P_1$. After a further lapse of a certain period of time, first motor 71 may be operated in the reverse direction to return cams 290 and 291 to their original positions shown in FIG. 37, with the result that cassette eject lever 304 is returned by spring 305 to its inoperative or stowed position shown on FIG. 37.

When a cassette 66 is ejected or forced forwardly out of raised holder 65 into cassette loading and unloading passage 63 by the above-described operation of cassette eject lever 304, the ejected cassette simultaneously engages both detection levers 81 and 82 for angularly displacing the latter in the direction of the arrow D' on FIG. 7, thereby to simultaneously turn ON cassette insertion detection switches 101 and 102.

Figure 40:
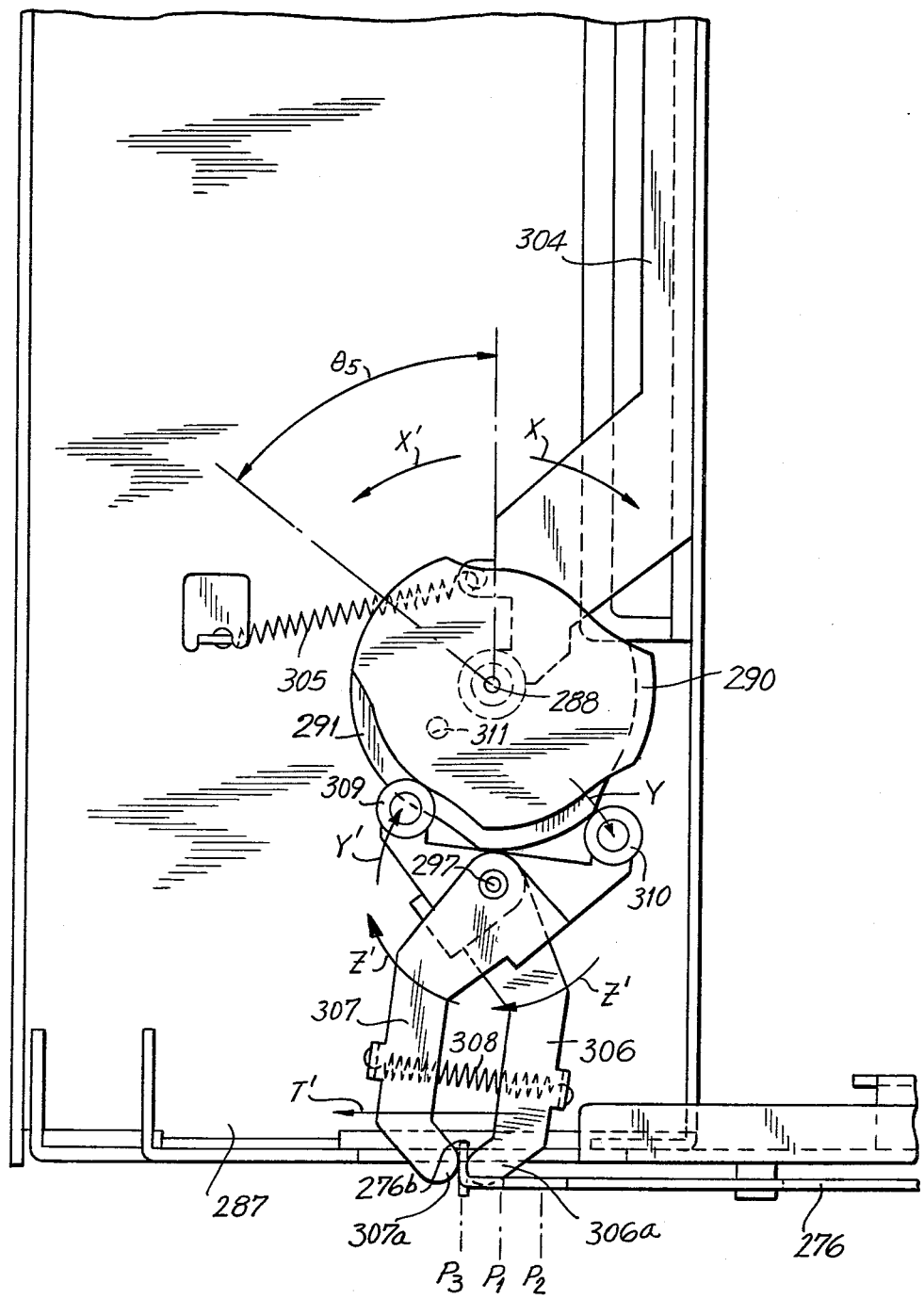

If with cams 290 and 291 in their neutral positions of FIG. 37, first motor 71 is operated in the reverse direction for angularly displacing cams 290 and 291 in the direction of arrow X' through an angle $\theta_5$, as on FIG. 40, cam follower roller 310 is displaced in the direction of arrow Y for angularly moving lever 307 in the direction of arrow Z'. Tensioned spring 308 causes lever 306 to also pivot in the direction of arrow Z' while roller 309 moves in the direction of arrow Y' in following the contour of cam 290. As a result, flange 276b of slide bar 276 is displaced in the direction of arrow T' for moving slide bar 276 to the rear position $P_3$. Thereafter, first motor 71 may be rotated in the forward direction for returning cams 290 and 291 to the neutral positions of FIG. 37 and correspondingly returning slide bar 276 to its neutral position $P_1$.

Figure 34:
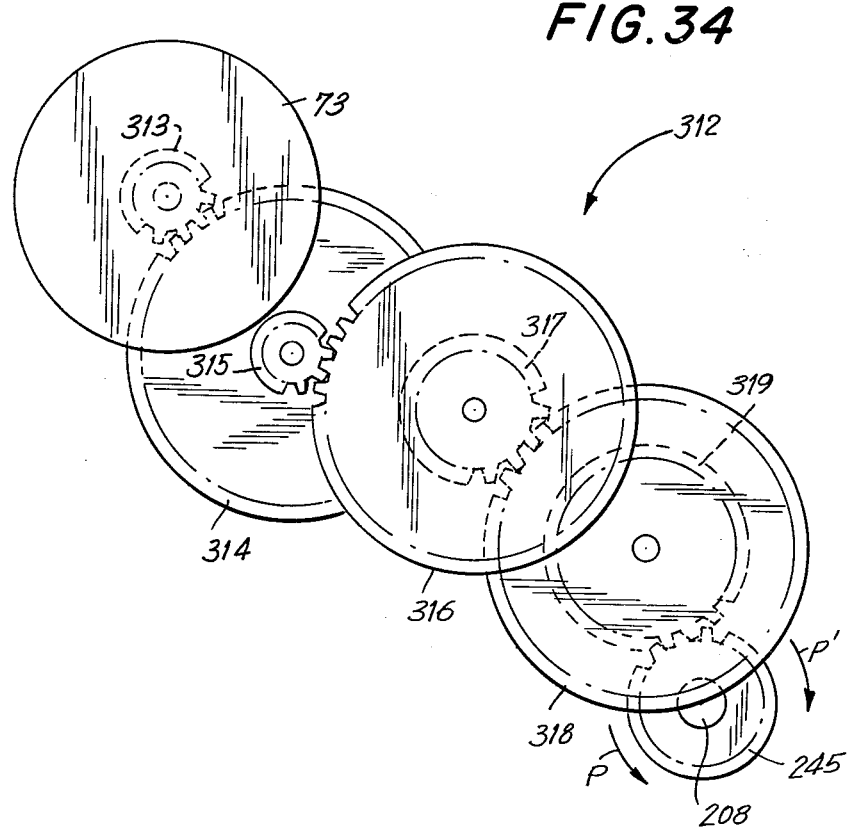
FIG. 34 is a side elevational view of another drive assembly included in the automatic cassette changer for effecting still other operating modes of the changer.
Figure 36:
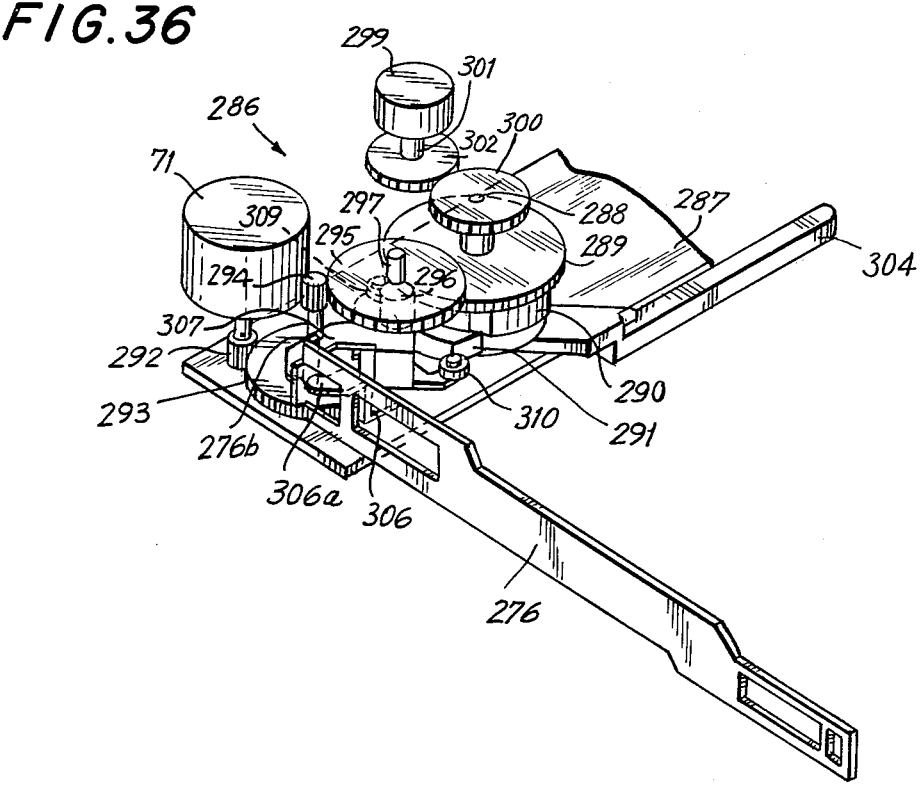
FIG. 36 is a perspective view of the cam assembly and the drive therefor shown on FIG. 35.
Figure 35:
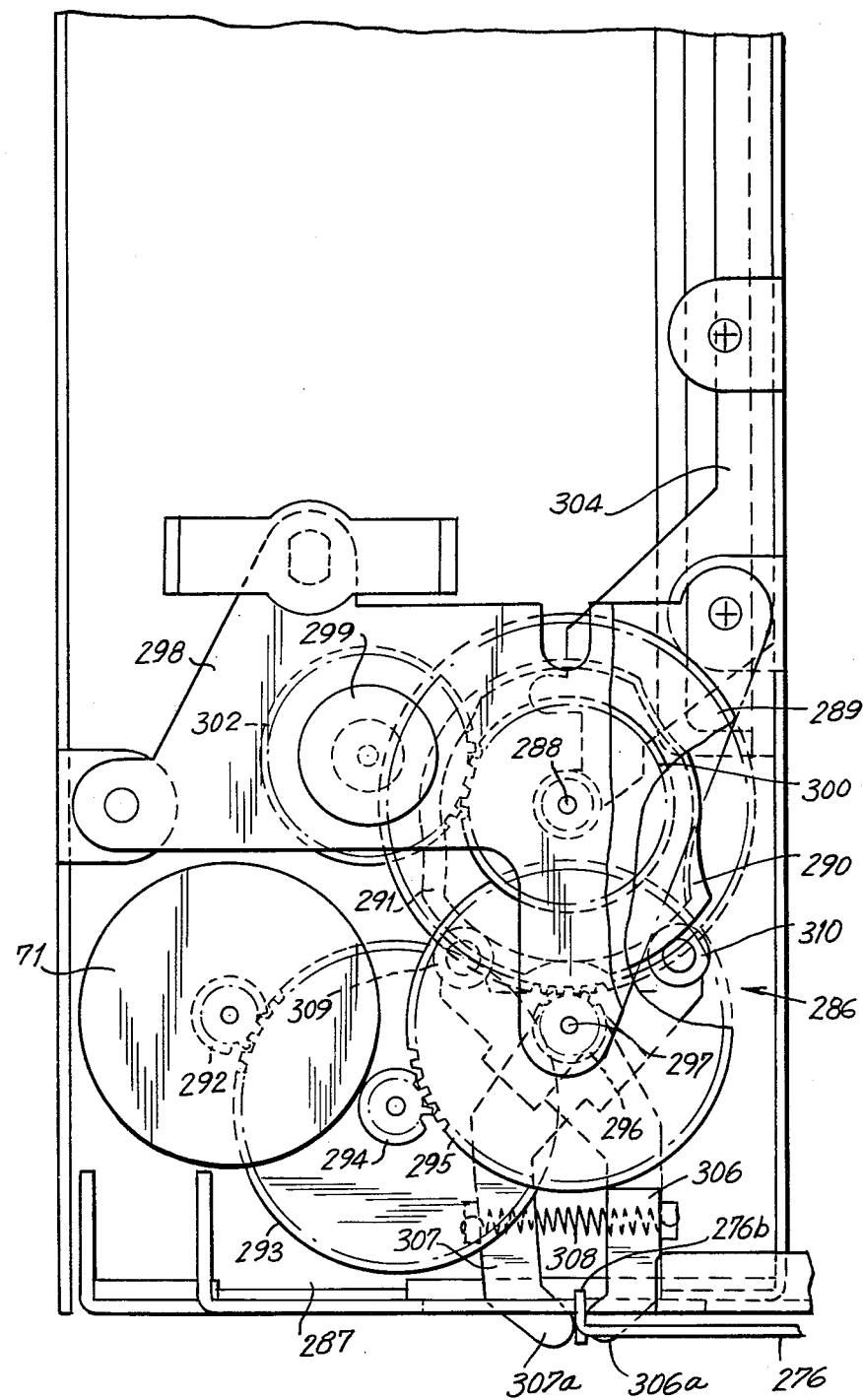
FIG. 35 is a top plan view of a cam assembly and the drive therefor for selecting the various operating modes of the automatic cassette changer.

Referring now to FIG. 34, it will be seen that a gear transmission 312 for driving gear 245 on shaft 208 from third motor 73 may include a motor gear 313 on the shaft of motor 73, and successive meshing gears 314, 315, 316, 317, 318 and 319. Thus, when third motor 73 is operated in its forward direction, gear 245 and shaft 208 are turned in the forward direction indicated by the arrow P for effecting operation of changer 52 in its recording push-button depressing mode, that is, for depressing recording push-button 59a. On the other hand, when motor 73 is operated in its reverse direction, gear 245 and shaft 208 are rotated in the direction of the arrow P' for effecting operation of the changer 52 in its reproducing push-button depressing mode, that is, for depressing reproducing push-button 57a.

Figure 28:
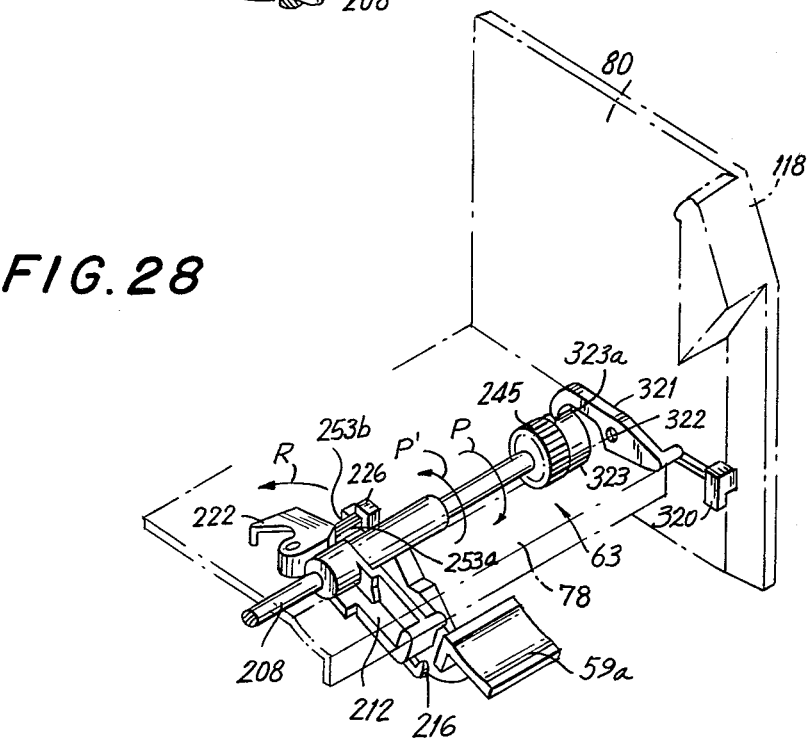
FIG. 28 is a fragmentary perspective view illustrating the automatic depressing of the recording push-button assembly.
Figure 29:
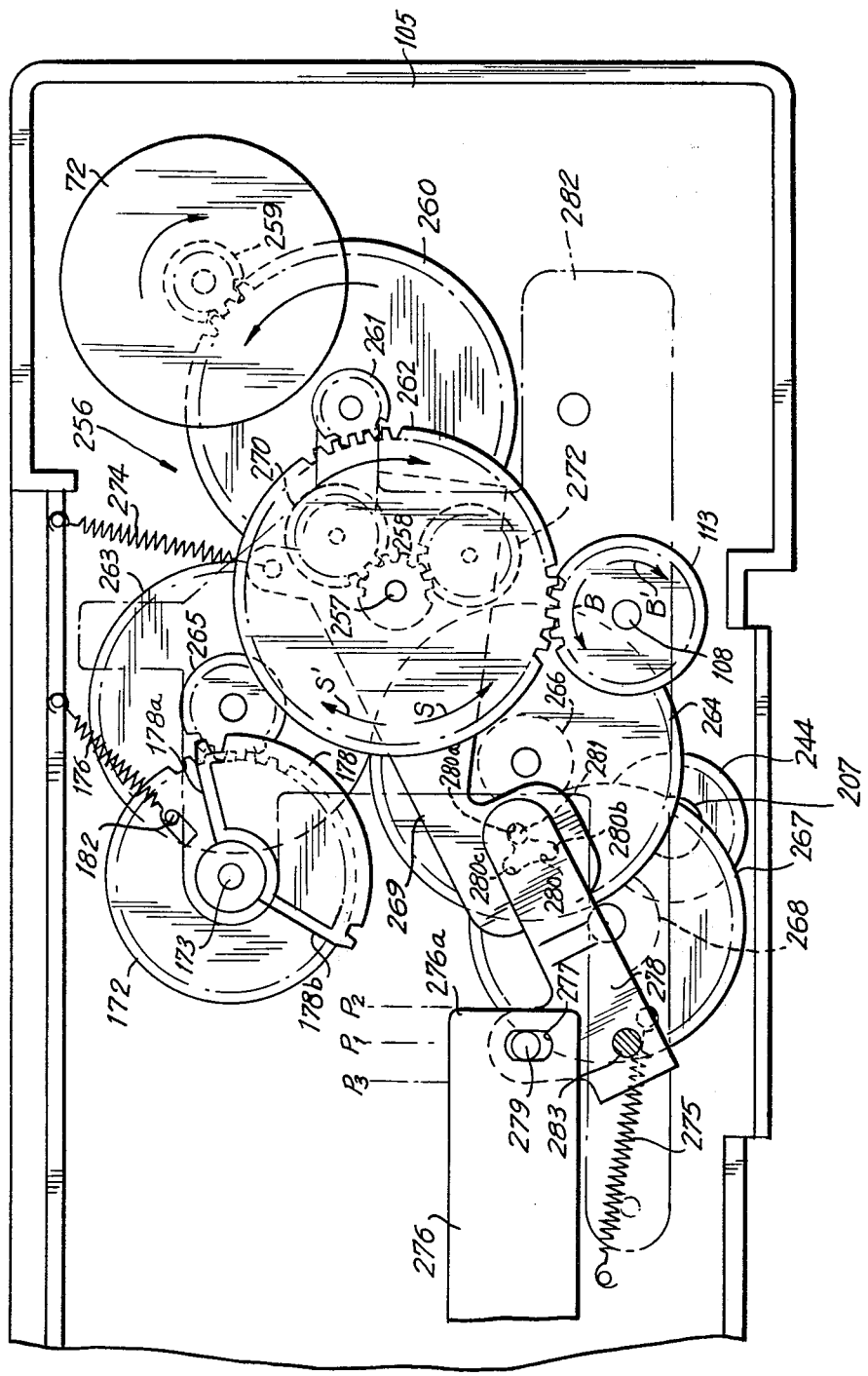
FIG. 29 is a side elevational view of a drive assembly included in the automatic cassette changer, and which is controllable for effecting a selected one of various operating modes of the changer.

As shown particularly on FIG. 28, an initial position detecting switch 320 is suitably mounted adjacent side plate 80 and is actuable by one end of a switch actuating lever 321 which is rockable, intermediate its ends, on a pivot 322. The other end of lever 321 is turned down and engageable with a cam 323 which is fixed on shaft 208 for rotation with the latter. Cam 323 has a radially raised portion 323a positioned to engage lever 321 for turning OFF switch 320 only when shaft 208 is in its initial position shown in full lines on FIG. 26 and on FIG. 28.

Referring now to FIG. 41, there is illustrated a block diagram of electronics that may be utilized for controlling the operations of automatic cassette changer 52. As shown, an input matrix circuit 324 is provided with a plurality of inputs to which the previously described switches 101, 102, 133, 199, 200, 223–226 and 320 are respectively connected. As those switches are selectively turned ON in the course of operation of changer 52, matrix circuit 324 provides an encoded output representing, at any time, the condition of changer 52 and of a cassette or cassettes therein. Such encoded output from matrix circuit 324 is applied to microcomputer or CPU 74 which is responsive thereto and, in accordance with a predetermined program, processes such input data or information and provides suitable output or control signals through an inverter circuit 325 to motor driving circuits 326, 327 and 328 which control the first, second and third motors 71, 72 and 73, respectively. As shown on FIG. 41, cassette changer 52 may be further provided with a fitting switch 329 which is suitably closed in response to the mounting of changer 52 on a VTR 51, and a manually actuable reset switch 330. Switches 329 and 330 are connected to a reset circuit 331 which, in response to the closing of switch 329 by the fitting or mounting of changer 52 on VTR 51, or in response to the manual closing of reset switch 330, provides a suitable reset signal to microcomputer 74 by which any in progress operation of changer 52 is halted and the changer is returned to its intial state.

Further, as shown on FIG. 41, an output of potentiometer 299 which varies with the rotational position of cams 290 and 291, and hence with the rotational position of motor 71, is applied to a comparator 333 for comparison in the latter with the output of a comparative voltage generation circuit 332 which is also controlled from microcomputer 74. The comparison output of comparator 333 is applied to matrix 324 along with feedback signals from microcomputer 74 so that the coded signals supplied by matrix 324 to microcomputer 74 will reflect at any time, the conditions of the switch inputs relative to the predetermined program and also the conditions or positions of cams 290 and 291 relative to such program. Finally, an output of microcomputer 74 is shown to be applied to LED driver circuits 334 and 335 for controlling the illumination of LED lamps 336 and 337, respectively. The lamp 336 is a RUN/ALM lamp which is illuminated during movements of changer 52. Preferably, if the changer 52 does not effect movements at a time when the same is called for by the program of microcomputer 74, then lamp 336 is made to flicker. The other lamp 337 is a READY lamp which is extinguished during movements of changer 52, but is illuminated only when a cassette has been operatively positioned in the associated VTR 51 and either the recording push-button 59a, the reproducing push-button 57a or the rewind push-button 55a has been depressed.

The operations of the above-described automatic cassette changer 52 according to this invention will now be described with reference to the timing charts of FIG. 42. At the start of operation of changer 52 and the associated VTR 51, cassette holder 65 of the VTR is in its raised position so that the holder-up detection switch 199 is ON, as a $t_1$ on chart C, and slide bar 276 is disposed in its neutral position $P_1$ so as to provide the condition of gear transmission 256 (FIG. 29) for either the cassette insertion mode of operation or the cassette discharge mode of operation. With changer 52 and VTR 51 thus initially disposed, one or more cassettes 66 are stacked in magazine 61 with the result that the next cassette detecting switch 133 is turned ON, as at $t_2$ on chart A of FIG. 42. Next, a cassette 66 is manually inserted into passage 63 under the stack of cassettes in magazine 61, with the result that cassette insertion detecting switches 101 and 102 are turned ON as at $t_3$ on chart B of FIG. 42. In response to such turning ON of switches 101 and 102 with slide bar 276 in neutral position $P_1$, second motor 72 is operated in the forward direction to similarly drive feed roller 64 with the result that the manually inserted cassette 66 is propelled by rollers 64 through passage 63 and into the raised cassette holder 65. Upon the full insertion of the cassette 66 into raised holder 65, cassette insertion detecting switches 101 and 102 are turned OFF, as at $t_4$ on chart B, and the forward operation of motor 72 is stopped, as shown on chart G. Further, in response to the turning OFF of cassette insertion detecting switches 101 and 102, first motor 71 is operated in the forward direction, as at $t_5$ on chart F, to displace slide bar 276 to its forward position $P_2$ (FIG. 32) and thereby establish the condition of gear transmission 256 for selecting either the cassette-drop mode of operation or the holder-down mode of operation of changer 52. When slide bar 276 attains its forward position $P_2$, first motor 71 is stopped and, thereafter, second motor 72 is operated in the reverse direction, as a $t_6$ on chart G, for operating changer 52 in its holder-down mode, that is, for causing holder actuating lever 188 to force down cassette holder 65 to its lowered or operative position, whereupon holder-down detecting switch 200 is turned ON, as at $t_7$ on chart D, and second motor 72 is stopped in response thereto. After second motor 72 has been stopped in response to the turning ON of switch 200 at $t_7$, first motor 71 is operated in the reverse direction, as at $t_{7a}$ on chart F, for returning slide bar 276 to its neutral position $P_1$ (FIG. 29), whereupon motor 71 is stopped. At the conclusion of the foregoing steps, changer 52 and VTR 51 are conditioned for the selection by the operator of that one of the recording, reproducing and rewind modes of operation of the VTR which is to be performed on the cassette which is then positioned in holder 65 at the operative position of the latter and thereafter also on the cassettes which may then be stacked in magazine 61 of changer 52.

Figure 42:
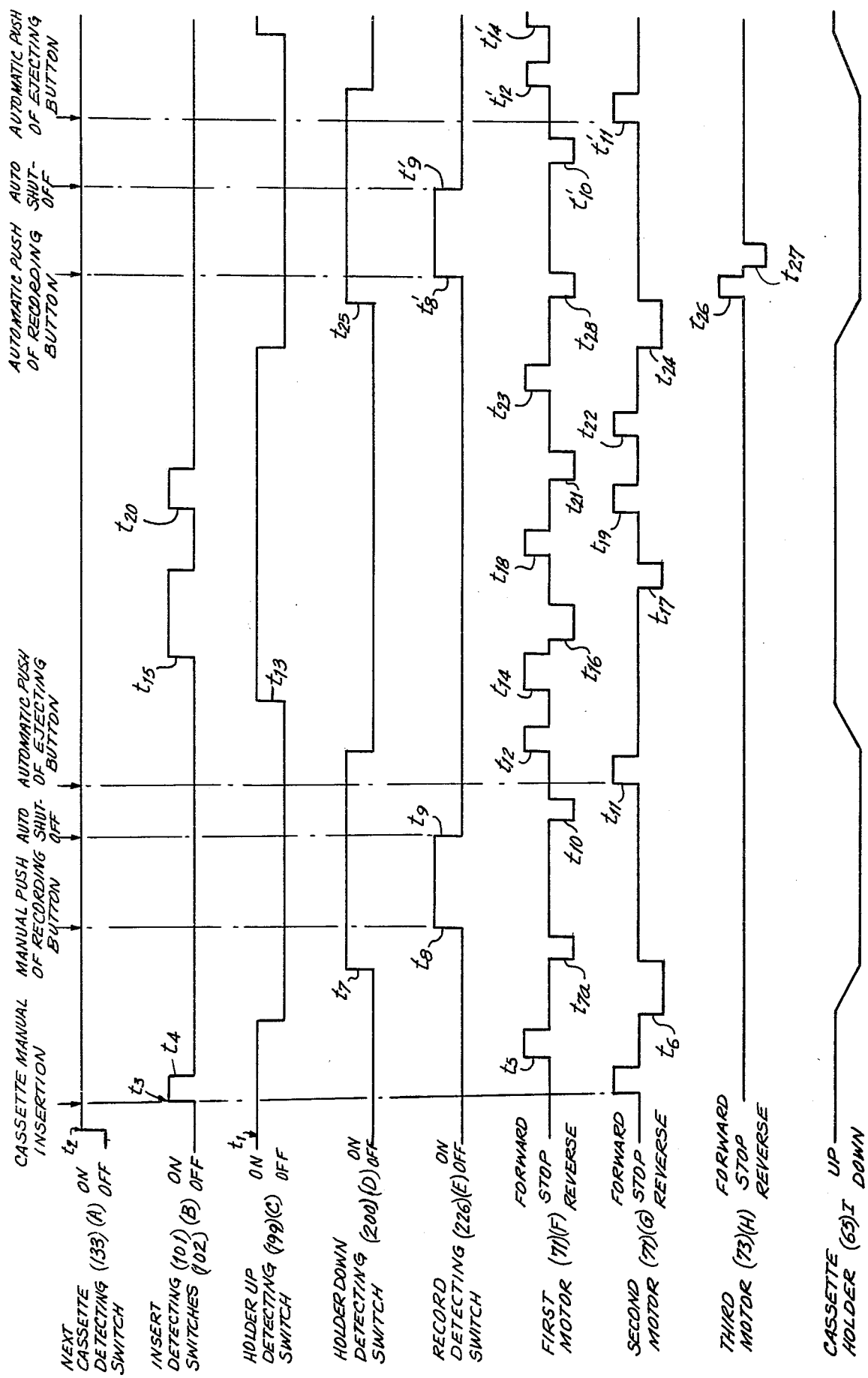
FIG. 42 shows timing diagrams indicating the timed relationship of the operations of various components of the automatic cassette changer during an operating cycle thereof when associated with a VTR which is in its recording mode of operation.

If the recording mode of operation of VTR 51 is selected, as is assumed on FIG. 42, the operator manually depresses recording push-button 59a which causes the recording push-button detecting switch 226 to be turned ON, as at $t_8$ on chart E, and the selection of the recording mode of operation is suitably memorized in microcomputer 74. The manual depressing of recording push-button 59a of changer 52 further causes depressing of the underlying recording button 59 of VTR 51 for initiating the recording operation of the latter. Such recording operation of VTR 51 continues until the conventional automatic shut-off mechanism of the VTR detects the end of the tape in the cassette then disposed in the operatively positioned holder 65, or until the arrival of a time preset in a conventional timer of the VTR, whereupon the automatic shut-off mechanism of the VTR unlatches or releases its recording button 59 for return to its rest or original position, with the result that push-button 59a and its associated detection lever 216 are also returned to their original positions shown in full lines on FIG. 26 to turn OFF recording push-button detecting switch 226, as at $t_9$ on chart E. In response to the foregoing, first motor 71 is operated in the reverse direction, as at $t_{10}$ on chart F, to displace slide bar 276 to its backward position $P_3$ with gear transmission 256 thus being conditioned for selecting either the depressing of the eject push-button or the depressing of the rewind push-button mode of operation of changer 52. Subsequently, as at $t_{11}$ on chart G, second motor 72 is operated in the forward direction so as to cause forward rotation of shaft 207 in the direction of the arrow P on FIG. 22, so that eject push-button 54a is automatically depressed to similarly depress the underlying eject button 54 of VTR 51. Such depressing of eject button 54 of VTR 51 conventionally causes the return of its cassette holder 65 to the raised position thereof. The automatic depressing of eject push-button 54a further causes the associated push-button detection switch 223 (FIG. 21) to be turned ON and, in response thereto, second motor 72 is stopped and first motor 71 is operated in the forward direction, as at $t_{12}$ on chart F, for returning slide bar 276 to its neutral position $P_1$.

When holder 65 has returned to its raised position, as indicated on chart I of FIG. 42, holder-up detecting switch 199 is turned ON, as at $t_{13}$ on chart C, and, in response thereto, first motor 71 is driven in the forward direction for an extended period of time, as at $t_{14}$, for turning cams 290 and 291 through the angle $\theta_2$ (FIG. 39) and thereby causing cassette eject lever 304 to eject the cassette from raised holder 65 into passage 63. The cassette 66 thus projected into passage 63 by lever 304 turns ON cassette insertion detecting switches 101 and 102, as at $t_{15}$ on chart B, and, in response thereto, first motor 71 is operated in the reverse direction, as at $t_{16}$ on chart F for returning slide bar 276 to its neutral position $P_1$. Thereafter, second motor 72 is operated in the reverse direction, as at $t_{17}$ on chart G, for driving feed rollers 64 in the reverse direction indicated by arrows B' on FIG. 3, with the result that feed rollers 64 propel the discharged cassette in the direction of the arrow A' onto discharged cassette receiver 62.

With the discharge of a cassette 66 onto a receiver 62, cassette insertion detecting switches 101 and 102 are turned OFF and, in response thereto, the reverse rotation of second motor 72 is stopped and first motor 71 is operated in the forward direction, as at $t_{18}$ on chart F, for disposing slide bar 276 in its forward position $P_2$ and thereby selecting the cassette-drop mode of operation or the holder-down mode of operation of changer 52. With the changer in such condition, second motor 72 is operated in the forward direction, as at $t_{19}$ on chart G, so that, as previously described, the lowermost cassette in magazine 61 is dropped automatically into passage 63 to again turn ON cassette insertion detection switches 101 and 102, as at $t_{20}$ on chart B. Such turning ON of switches 101 and 102 causes first motor 71 to be operated in the reverse direction, as at $t_{21}$ on chart F, for returning slide bar 276 to its neutral position $P_1$ and, thereafter, second motor 72 is operated in the forward direction, as at $t_{22}$ on chart G, so that feed rollers 64 are driven in the direction of the arrows B on FIG. 3 for propelling the dropped cassette 66 into the raised cassette holder 65. Thereafter, first motor 71 is operated in the forward direction, as at $t_{23}$ on chart F, to displace slide bar 276 to its forward position $P_2$ and, with gear transmission 256 in the respective condition (FIG. 32), second motor 72 is operated in the reverse direction, as at $t_{24}$ on chart G, so that cassette holder 65 is forced down to its operative or lowered position which is detected by switch 200, as at $t_{25}$ on chart D. In response to such turning ON of switch 200, and the earlier storing in microcomputer 74 of the selection of the recording mode of operation of VTR 51, third motor 73 is operated in the forward direction, as at $t_{26}$ on chart H. Such operation of motor 73 causes turning of shaft 208 in the direction of the arrow P (FIGS. 26, 28 and 34) so that recording push-button 59a is automatically depressed to similarly depress the underlying button 59 of VTR 51 and again initiate the recording operation of the latter. Immediately after recording push-button 59a has been depressed to automatically initiate the recording operation of VTR 51, third motor 73 is operated in the reverse direction, as at $t_{27}$ on chart H, so as to return shaft 208 to its original position, as detected by the turning ON of switch 320 (FIG. 28).

Further, in response to the turning ON of holder-down detecting switch 200, first motor 71 is operated in the reverse direction, as at $t_{28}$ on chart F, for returning slide bar 276 to its neutral position $P_1$. After the automatic initiation of the recording operation of VTR 51 indicated by the turning ON of record push-button detecting switch 226, as at $t'_8$ on chart E, the remainder of the cycle of operations of changer 52 and of the associated VTR 51 is as previously described. Thus, in response to the end of the tape in the cassette then in the operatively positioned holder 65, or in response to the arrival of a preset time, the automatic shut-off mechanism of the VTR unlatches its recording button 59 for return to its rest position, thereby halting the recording operation and returning push-button 59a and the respective detection lever 216 to their normal positions shown in full lines on FIG. 26, as indicated by the turning OFF of detecting switch 226, as at $t'_9$ on chart E. Thereafter, first motor 71 is shown to undergo the operations indicated at $t'_{10}$, $t'_{12}$ and $t'_{14}$ while second motor 72 undergoes the operation indicated at $t'_{11}$, and which respectively correspond to the previously described operations $t'_{10}$, $t'_{12}$, $t'_{14}$ and $t'_{11}$.

In any event, the cassette on which a recording operation has been completed is eventually discharged through passage 63 and the cassette which is then lowermost in magazine 61 is thereafter supplied to VTR 51 for automatic resumption of the recording operation thereon. When the last of the cassettes originally stacked in magazine 61 has been dropped from the latter and inserted into holder 65, the next-cassette detecting switch 133 is turned OFF with the result that the operation of changer 52 is halted at the completion of the next full cycle.

In the above-described operations of changer 52, it has been assumed that the operator initially manually depressed recording push-button 59a, as at $t_8$, so that the VTR 51 would be made to perform recording operations on the tapes in the successively supplied cassettes 66. However, if the operator desires that the VTR 51 should perform reproducing or playback operations on the tapes in the successively supplied cassettes, then at the time corresponding to that indicated at $t_8$ on chart E of FIG. 42, the operator merely depresses reproduced push-button 57a which depresses the respective button 57 of VTR 51 for initiating a first reproduce or playback operation, and further for causing microcomputer 74 to store data indicating that it is the reproducing or playback operation which is to be thereafter effected. In that case, at the time indicated at $t_{26}$ on chart H, third motor 73 would be made to operate in the reverse direction, rather than in the forward direction as on FIG. 42, thereby to turn shaft 208 in the direction of the arrow P′ so that reproducing push-button 57a is thereby depressed automatically for depressing the underlying button 57 and thereby initiating the reproducing or playback operation of VTR 51. Following the operation of third motor 73 in the reverse direction, such motor is again operated briefly in the forward direction for returning shaft 208 to its original position detected by switch 320. Apart from the foregoing, the operations of changer 52 when employed with a VTR 51 for which the playback or reproducing mode of operation has been selected, are the same as the operations previously described in detail for the case where the recording mode of operation has been selected.

Figure 43:
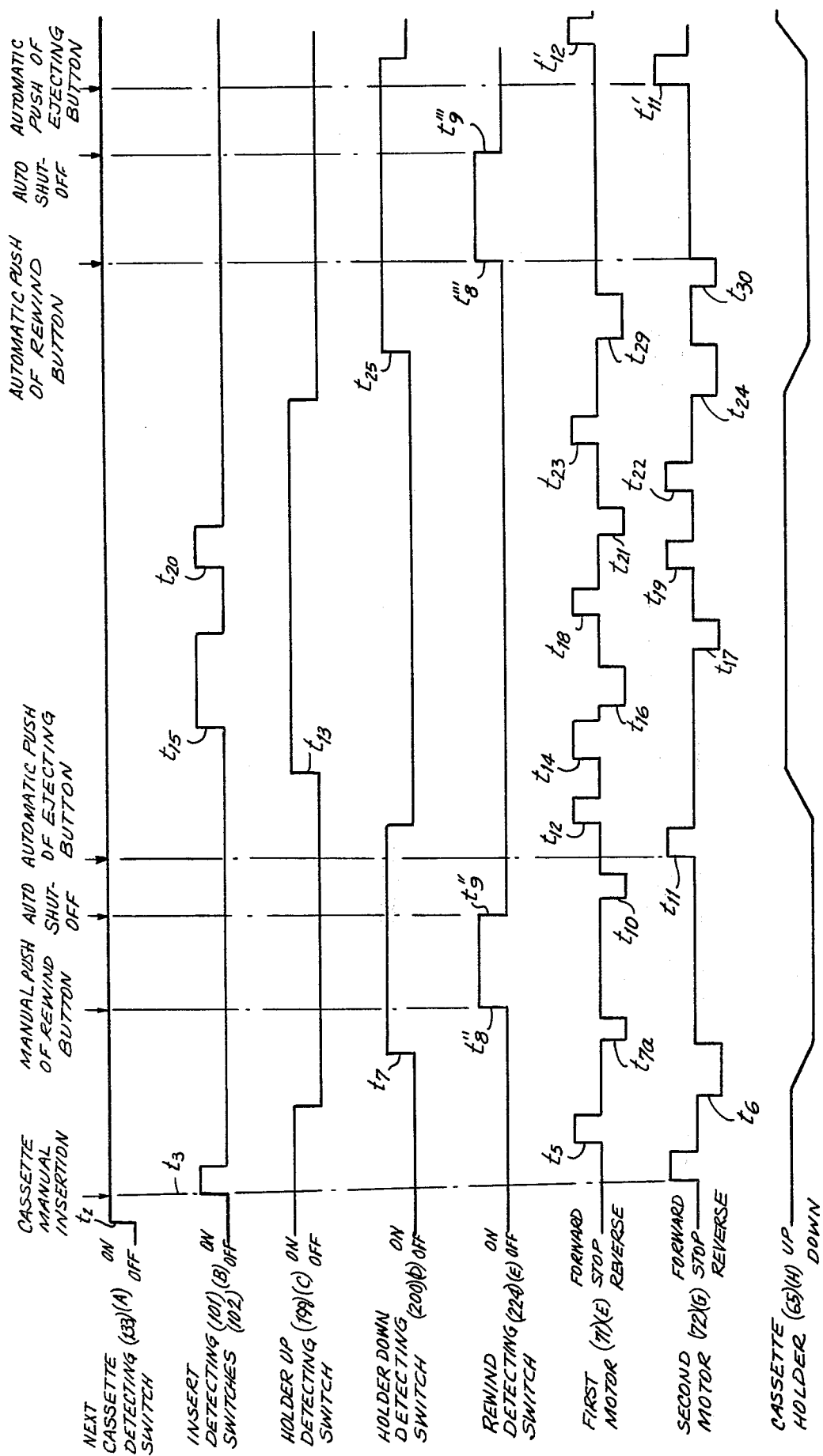
FIG. 43 shows timing diagrams similar to those of FIG. 42, but for the rewind mode of operation of the associated VTR.

Referring now to the timing charts or diagrams of FIG. 43, it will be seen that, when the rewind mode of operation of the VTR 51 is selected, the operations of changer 52 are substantially the same as those described above for the case of the selection of the recording mode of operation up to the time indicated at $t_{25}$ on chart D of FIG. 43, with the exception that, at the time indicated at $t''_8$ on chart E, the operator manually depresses rewind push-button 55a for similarly depressing rewind button 55 of the VTR and initiating the rewind operation of the latter. Of course, depressing rewind push-button 55a results in turning ON rewind push-button detecting switch 224 and, as a result thereof, microcomputer 74 stores data indicating the initial manual selection of the rewind mode of operation, to ensure that such rewind mode of operation will be thereafter automatically selected for the cassettes which are supplied, in succession, from magazine 61 of changer 52 to VTR 51.

At the end of the tape in the cassette that was originally manually inserted for performance of a rewind operation thereon, or upon the arrival of a time preset in a timer of the VTR, the automatic shut-off mechanism of the VTR again releases or unlatches the rewind button 55 for return to its original position, with the result that rewind push-button 55a and its detection lever 214 are also returned to their original positions and the corresponding rewind push-button detecting switch 224 is turned OFF, as at $t''_9$ on chart E of FIG. 43.

However, after the holder-down detecting switch 200 has been turned ON, as at $t_{25}$ on chart D of FIG. 43, that is, after holder 65 has been moved downwardly to its operative position with a cassette therein which has been automatically supplied to holder 65 by changer 52, first motor 71 is made operative in the reverse direction for an extended time, as at $t_{29}$ on chart F of FIG. 43, so that slide bar 276 is displaced to its backward position $P_3$ (FIG. 33) which conditions gear transmission 256 for selection of either the eject push-button depressing mode of operation or the rewind push-button depressing mode of operation. Immediately after slide bar 276 has been moved to its position $P_3$, second motor 72 is made operative in its reverse direction, as at $t_{30}$ on chart G, so that shaft 207 is turned in the direction P′ on FIG. 24 for depressing rewind push-button 55a and similarly depressing rewind button 55 of the VTR so as to automatically initiate a rewind operation of the VTR. The automatic depressing of push-button 55a is detected by turning ON of rewind push-button detecting switch 224, as at $t'''_8$ on chart E.

The rewind operation continues until the automatic shut-off mechanism of VTR 51 is made operative to unlatch rewind button 55 and thereby cause return of rewind push-button 55a to the normal position shown in full lines on FIG. 24, in response to which switch 224 is turned OFF, as at $t'''_9$ on chart E. Upon such termination of a rewind operation, slide bar 276 is already in its rearward position $P_3$ so that, when second motor 72 is operated in its forward direction, as at $t'_{11}$ on chart G of FIG. 43, the desired automatic depressing of eject push-button 54a is obtained. Thereafter, the automatic operation of changer 52 continues as previously described, with the exception that, as each cassette is supplied to VTR 51, the latter is made operative to rewind the tape therein. As before, the operations of changer 52 continue for a complete cycle after switch 133 has been turned OFF to indicate that the last cassette has been removed from magazine 61.

It will be appreciated that, in the above described changer 52 embodying this invention, first motor 71 operates to drive a mode selecting means 286 having a plurality of conditions each corresponding to respective operating modes of the changer, and that the second motor 72 is operative to drive an actuator means, for example, in the form of the gear transmission 256, for causing operation of the changer in a selected one of the operating modes determined by the mode selecting means and by the direction of operation of the second motor 72. The third motor 73, when driven, causes operations of the changer 52 in accordance with still other modes which are selected by the direction of operation of motor 73.

By reason of the above characteristic features of changer 52, an electrical control system is feasible for controlling the operations of motors 71, 72 and 73 in a desired sequence to achieve automatic changing of cassettes. By reason of the foregoing, the resulting changer is relatively inexpensive and reliable in that malfunctions and other inconveniences are not likely to occur, and further it is possible to conveniently achieve automatic repetition of a selected mode of operation of the VTR on the successively changed cassettes.

Having described a preferred embodiment of the invention with reference to the accompanying drawings, it is to be understood that the invention is not limited to that precise embodiment, and that various changes and modifications may be effected therein by one skilled in the art without departing from the scope or spirit of the invention which is intended to be defined in the appended claims.

What is claimed is:

1. An automatic cassette changer having a plurality of operating modes for automatically changing cassettes; comprising mode selecting means actuable for selecting said operating modes of the changer, a first motor for driving said mode selecting means, actuator means adapted to be driven for causing operation of the changer in a selected one of said operating modes determined by said mode selecting means, and a second motor for driving said actuator means.

2. An automatic cassette changer according to claim 1; in which said mode selecting means has a plurality of conditions each corresponding to two respective operating modes of the changer, and said second motor is reversible for driving said actuator means in first and second directions, respectively, said actuator means, in each of said conditions of the mode selecting means, causing operation of the changer in one of said two respective operating modes when driven in said first direction and in the other of said two respective operating modes when driven in said second direction.

3. An automatic cassette changer according to claim 2; in which said mode selecting means includes cam means rotatable by said first motor so that said conditions of the mode selecting means correspond to respective rotational positions of said cam means.

4. An automatic cassette changer according to claim 3; in which said mode selecting means further includes gear shifting means displaceable by said cam means in response to rotation of the latter by said first motor; and in which said actuator means includes a plurality of driven gears corresponding to respective operating modes of the changer, a driving gear coupled with said second motor, and intermediate gear means displaceable with said gear shifting means for selectively transmitting torque from said driving gear to said driven gears in accordance with the rotational position of said cam means.

5. An automatic cassette changer according to claim 4; further comprising a plurality of detecting means for detecting cassettes at respective positions in the changer, and control means for determining the rotational position of said first motor and the rotational direction of said second motor in response to said plurality of detecting means.

6. An automatic cassette changer according to claim 2; further comprising a plurality of detecting means for detecting cassettes at respective positions in the changer, and control means for determining the rotational position of said first motor and the rotational direction of said second motor in response to said plurality of detecting means.

7. An automatic cassette changer for use with a cassette VTR having buttons depressible for initiating at least recording, reproducing and rewinding operations, respectively, of the VTR, and for ejecting a cassette, and a cassette holder movable between a raised position for receiving or delivering a cassette and a lowered position at which a cassette in said holder can have a selected one of said operations performed on its tape by the VTR, with the cassette holder being returned to said raised position upon depressing of the button for ejecting a cassette; said automatic cassette changer comprising a housing having means defining a magazine for containing a plurality of cassettes; manipulating means operative in a plurality of modes in succession for removing a cassette from said magazine, inserting the removed cassette into the cassette holder at said raised position of the latter, moving the cassette holder to said lowered position so that the VTR can perform a selected operation on the tape of a cassette in said holder, and discharging the cassette from said holder upon the return of the latter to said raised position; mode selecting means actuable to a plurality of conditions for selecting said modes of the manipulating means; a first motor for driving said mode selecting means to a selected one of said conditions; actuator means adapted to be driven for causing operation of said manipulating means in each selected one of said modes of the latter determined by said mode selecting means; and a second motor for driving said actuator means.

8. An automatic cassette changer according to claim 7; in which each of said conditions of said mode selecting means correspond to two respective modes of said manipulating means, and said second motor is reversible for driving said actuator means in first and second directions, respectively, said actuator means, in each of said conditions of the mode selecting means, causing operation of the manipulating means in one of said two respective modes when driven in said first direction and in the other of said two respective modes when driven in said second direction.

9. An automatic cassette changer according to claim 8; in which said mode selecting means includes cam means rotatable by said first motor so that said conditions of the mode selecting means correspond to respective rotational positions of said cam means.

10. An automatic cassette changer according to claim 9; in which said mode selecting means further includes gear shifting means displaceable by said cam means in response to turning of the latter by said first motor; and in which said actuator means includes a plurality of driven gears corresponding to respective modes of the manipulating means, a driving gear coupled with said second motor, and intermediate gear means displaceable with said gear shifting means for selectively transmitting torque from said driving gear to at least one of said driven gears in accordance with the rotational position of said cam means.

11. An automatic cassette changer according to claim 8; further comprising a plurality of detecting means for detecting cassettes at respective positions in the changer and the positions of said holder, and control means for determining the rotational position of said first motor and the rotational direction of said second motor in response to said plurality of detecting means.

12. An automatic cassette changer according to claim 8; further comprising a third reversible motor, and means driven by said third motor for causing two additional operations of the changer when said third motor is operated in first and second directions, respectively.

13. An automatic cassette changer according to claim 7; further comprising depressible push-buttons which, when said changer is in use with said VTR, overlie respective ones of said depressible buttons of the VTR for acting from above on the respective buttons, a rotatable support shaft on which a plurality of said push-buttons are mounted, means for depressing one of said push-buttons mounted on the shaft in response to turning of said shaft in one direction, and means for depressing another of said push-buttons mounted on the shaft in response to turning of said shaft in the opposite direction; and in which said actuator means transmits torque of said second motor to said shaft when said mode selecting means is in another of said conditions thereof, and said second motor is reversible for selectively turning said shaft in said one direction for depressing said one push-button and in said opposite direction for depressing said other push-button.

14. An automatic cassette changer according to claim 13; further comprising another rotatable support shaft on which a plurality of said push-buttons are mounted, means for depressing one of said push-buttons mounted on said other shaft in response to turning of said other shaft in one direction, means for depressing another of said push-buttons mounted on said other shaft in response to turning of the latter in the opposite direction, and a third motor which is reversible for driving said other shaft in said one direction and said opposite direction, respectively, for selectively depressing said one push-button and said other push-button mounted on said other shaft.

15. An automatic cassette changer according to claim 14; further comprising a plurality of detecting means for detecting cassettes at respective positions in the changer, positions of said holder, and conditions of said push-buttons, and control means for determining the rotational position of said first motor and the rotational directions of said second and third motors in response to said plurality of detecting means.

16. An automatic cassette changer according to claim 7; in which said housing has a passage for cassettes extending therethrough to open at said cassette holder in the raised position of the latter, and said magazine is disposed above said passage and contains said plurality of cassettes in a stack; said manipulating means includes cassette dropping means operative to drop the lowermost cassette of said stack into said passage, feed rollers at the bottom of said passage and being operative to propel a cassette therein selectively toward or away from said cassette holder, and holder actuating means operative to displace said holder from said raised position to said lowered position; said actuator means includes shiftable gear transmission means having a first state in which said feed rollers are coupled to said second motor and at least a second state in which said cassette dropping means and said holder actuating means are coupled to said second motor; said second motor is reversible so that, in said first state of the gear transmission means, said feed rollers propel a cassette in said passage toward and away from the cassette holder in response to operation of said second motor in opposed direction, respectively, and, in said second state, said cassette dropping means and said holder actuating means are made operative in response to operation of said second motor in said opposed directions, respectively.

17. An automatic cassette changer according to claim 16; in which said mode selecting means includes means for shifting said gear transmission means between at least said first and second states.

18. An automatic cassette changer according to claim 17; further comprising depressible push-buttons which, when said changer is in use with said VTR, overlie respective ones of said depressible buttons of the VTR for acting thereon from above, a rotatable support shaft on which a plurality of said push-buttons are mounted, means for depressing one of said push-buttons mounted on the shaft in response to turning of said shaft in one direction, and means for depressing another of said push-buttons mounted on said shaft in response to turning of the latter in the opposite direction; and in which said gear transmission means is shiftable by said mode selecting means to a third state in which said second motor is coupled to said shaft for causing depressing of said one push-button, and of said other push-button upon operation of said second motor in said opposed directions, respectively.

19. An automatic cassette changer according to claim 18; in which said one push-button and said other push-button mounted on said shaft are disposed to overlie said buttons of the VTR for initiating a rewinding operation and for ejecting a cassette, respectively.

20. An automatic cassette changer according to claim 19; further comprising another rotatable support shaft on which a plurality of said push-buttons are mounted to overlie said buttons of the VTR for initiating recording and reproducing operations, means for depressing one of said push-buttons mounted on said other shaft in response to turning of said other shaft in one direction, means for depressing another of said push-buttons mounted on said other shaft in response to turning of the latter in the opposite direction, and a third motor which is reversible for driving said other shaft in said one direction and said opposite direction, respectively.

21. An automatic cassette changer according to claim 17; in which said mode selecting means includes cam means rotatable by said first motor so that said states of the shiftable gear transmission means correspond to respective rotational positions of said cam means; and further comprising eject means operative to propel a cassette out of the raised cassette holder into said passage, and means also driven by said first motor for operating said eject means.

22. An automatic cassette changer according to claim 21; in which said cam means are configured to select said first state of the gear transmission means when said eject means is operated.

* * * * *